United States Patent
Banhidy et al.

(10) Patent No.: US 10,552,895 B2
(45) Date of Patent: Feb. 4, 2020

(54) COMPUTER SYSTEM AND STORED PROGRAM FOR CERTIFYING CONTRACTORS

(71) Applicant: SERVICE TRADING COMPANY, INC., Irvine, CA (US)

(72) Inventors: Todd Banhidy, Orange, CA (US); Matt Brunmeier, Corona Del Mar, CA (US)

(73) Assignee: Service Trading Company, Inc., Irvine, CA (US)

( * ) Notice: Subject to any disclaimer, the term of this patent is extended or adjusted under 35 U.S.C. 154(b) by 0 days.

(21) Appl. No.: 16/324,693

(22) PCT Filed: Aug. 11, 2017

(86) PCT No.: PCT/US2017/046552
§ 371 (c)(1),
(2) Date: Feb. 11, 2019

(87) PCT Pub. No.: WO2018/031912
PCT Pub. Date: Feb. 15, 2018

(65) Prior Publication Data
US 2019/0180212 A1    Jun. 13, 2019

Related U.S. Application Data

(60) Provisional application No. 62/373,916, filed on Aug. 11, 2016.

(51) Int. Cl.
*G06Q 30/06* (2012.01)
*G06Q 30/00* (2012.01)
*G06Q 10/06* (2012.01)

(52) U.S. Cl.
CPC ... *G06Q 30/0635* (2013.01); *G06Q 10/06316* (2013.01); *G06Q 30/018* (2013.01)

(58) Field of Classification Search
CPC .................................................. G06Q 30/0635
(Continued)

(56) References Cited

U.S. PATENT DOCUMENTS 6,978,246 B1 * 12/2005 Ruvolo ................ G06Q 10/109
705/7.19
7,096,193 B1 * 8/2006 Beaudoin ......... G06Q 10/06311
705/26.1
(Continued)

FOREIGN PATENT DOCUMENTS

WO    2014151568 A1    9/2014

*Primary Examiner* — Alexis M Casey
(74) *Attorney, Agent, or Firm* — Total Awareness Consulting Services; Robert Winslow

(57) ABSTRACT

A certification computer system electronically receives contractor data from contractor devices. The certification computer system electronically stores at least a portion of the contractor data as certification data in a storage device(s). The certification computer system automatically certifies third-party contractors as certified contractors based, at least in part, on the certification data. The certification computer system electronically receives an electronic service request communicated from an e-commerce computer system. The electronic service request is based, at least in part, on a purchase(s) of a product(s) with a contractor service(s) made in electronic communication with a purchaser computer system. The certification computer system automatically creates an electronic service work order based, at least in part, on the electronic service request. The certification computer system automatically selects a certified contractor from the certified contractors. The certification computer system electronically communicates the electronic service work order to the certified contractor.

28 Claims, 6 Drawing Sheets

(58) Field of Classification Search
USPC .................................................. 705/26.81
See application file for complete search history.

(56) References Cited

U.S. PATENT DOCUMENTS

| | | | |
|---|---|---|---|
| 7,167,855 B1* | 1/2007 | Koenig | G06Q 30/02 |
| 9,329,903 B2 | 5/2016 | Deshpande et al. | |
| 2006/0106624 A1 | 5/2006 | Hardin et al. | |
| 2007/0055634 A1 | 3/2007 | Albertao | |
| 2008/0281755 A1 | 11/2008 | Brown | |
| 2009/0089074 A1* | 4/2009 | Schoenberg | G06Q 30/02 |
| | | | 705/2 |
| 2010/0017337 A1 | 1/2010 | Butler et al. | |
| 2010/0125482 A1 | 5/2010 | Burke et al. | |
| 2011/0313804 A1* | 12/2011 | Camp | G06Q 10/02 |
| | | | 705/7.13 |
| 2012/0109713 A1 | 5/2012 | Wilhite | |
| 2013/0046648 A1* | 2/2013 | Calman | G06Q 30/08 |
| | | | 705/26.3 |
| 2015/0046193 A1 | 2/2015 | Harmon et al. | |

* cited by examiner

COMPUTER SYSTEM AND STORED PROGRAM FOR CERTIFYING CONTRACTORS

CROSS-REFERENCE TO RELATED APPLICATIONS

This application claims the benefit of U.S. Provisional Application No. 62/373,916, filed Aug. 11, 2016, which is hereby incorporated by reference in its entirety.

BACKGROUND

Many potential purchasers of products may hesitate purchasing products that may require a contractor service such as installation. Some contractors may not be certified. Finding a certified contractor may be difficult for some purchasers. Finding an available contractor may be difficult for some purchasers. Many potential purchasers may be concerned with being overcharged by contractors. Many contractors may be concerned about getting paid by purchasers after a contracted service has been completed for the purchasers. Many potential purchasers may be uncomfortable disclosing banking data directly to contractors.

Many e-commerce providers recognize that some potential product sales may be lost due to leaving the burden to find a contractor to purchasers. Contractor(s) may be desired to complete a required contractor service related to a potential product purchase. Many e-commerce providers recognize the liability of recommending third-party contractors. Some e-commerce providers may hire and/or certify contractors directly. However, this may be a time-consuming process. Furthermore, a plurality of third-party contractors in a plurality of locations covering a plurality of contractor service types may be needed to cover a plurality of products offered for sale through an e-commerce system available on a global network such as the Internet. Automated systems, stored programs, and methods are needed to certify third-party contractors to provide contractor services for purchasers.

Many e-commerce providers realize that some potential sales may be lost if purchasers are not offered transactions that are easily understandable and immediate. Automated systems, stored programs, and methods are needed to improve e-commerce transactions for purchasers of products and related contractor services.

DETAILED DESCRIPTION OF EMBODIMENTS

At least some embodiments of the present disclosure automatically certify third-party contractors. At least some embodiments of the present disclosure automatically select a certified contractor(s) based, at least in part, on a purchase of at least one product with at least one contractor service. At least some embodiments of the present disclosure offer improvements over existing contractor certifying systems, programs, and methods. These improvements include but are not limited to: more efficient certification of third-party contractors, more accurate certification of third-party contractors, more efficient selection of a certified contractor(s) who is certified to perform the at least one contractor service, and/or more efficient transfer of data from the purchaser employing a purchaser computer system(s) to the certified contractor(s) employing a contractor device(s).

At least some embodiments of the present disclosure automatically partially certify third-party contractors. At least some embodiments of the present disclosure offer improvements over existing contractor certifying systems, programs, and methods. These improvements include but are not limited to: more efficient identification of third-party contractors who are nearly ready for certification, more efficient communication of requirements missing for certification to third-party contractors employing contractor devices, more efficient certification of third-party contractors, and/or more accurate certification of third-party contractors.

At least some embodiments of the present disclosure automatically place a product code and a service code in an electronic shopping cart presented by a second party to a first-party purchaser. At least some embodiments of the present disclosure automatically map products with contractor services. At least some embodiments of the present disclosure offer improvements over existing e-commerce systems, programs, and methods that are not configured to automatically enable a purchase of a product(s) with a related contractor service(s) in a single transaction. These improvements include but are not limited to: more efficient purchasing of products and related contractor services, a greater offering of products that may require contractor services for sellers employing e-commerce systems, programs, and methods, and/or more efficient transfers of funds from purchasers to contractors.

Figure 1:
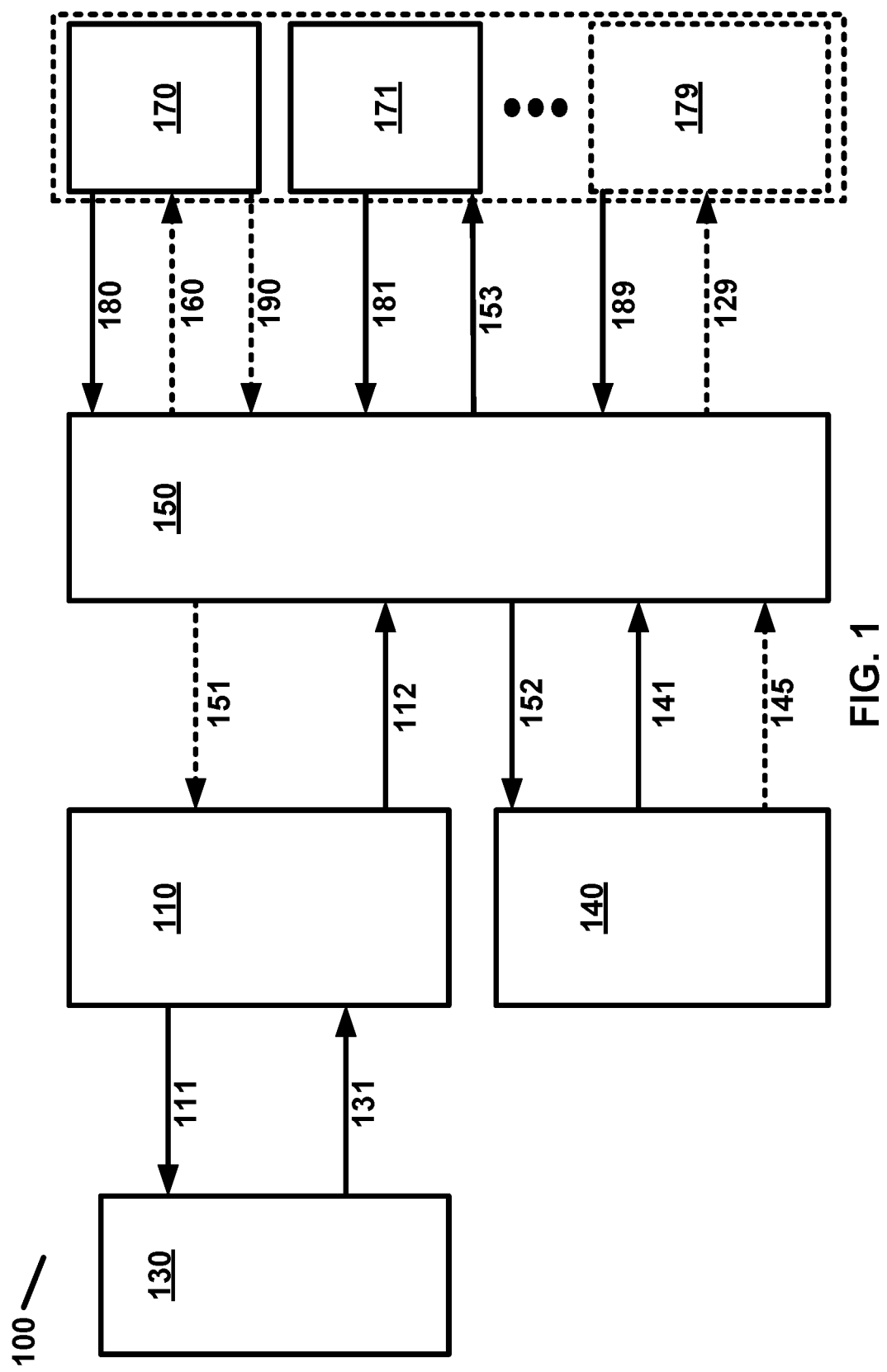
FIG. 1 is an example block diagram showing a certification computer system network as per an aspect of various embodiments.

FIG. 1 is an example block diagram showing a certification computer system network 100 as per an aspect of various embodiments. The computer system network 100 may comprise at least one certification computer system 150, at least one data storage device 140, and a plurality of contractor devices (170, 171 . . . 179). The at least one certification computer system 150, the at least one data storage device 140, and the plurality of contractor devices (170, 171 . . . 179) may communicate through employment of a global computer network (for example the Internet). Communication through employment of the global computer network may further employ at least one application, website, digital portal, Application Programming Interface (API), electronic message, digital file, combinations thereof, and/or the like.

According to some of the various embodiments, at least one certification computer system 150 may be programmed to access at least one data storage device 140. The at least one certification computer system 150 may be programmed to receive contractor data (180, 181 . . . 189) from at least some of a plurality of contractor devices (170, 171 . . . 179). The contractor data (180, 181 . . . 189) may comprise, for example, company data, contact data, license data, geographic data, insurance data, banking data, tax data, background data, employee data, skill set data, equipment data, training data, contractor requirement data, drug test data, at least one digital photo, combinations thereof, and/or the like. Company data may comprise data on an entity or an employer associated with at least one third-party contractor. License data may comprise a reference to at least one license and/or certification achieved by at least one third-party contractor. Geographic data may comprise at least one location comprising a GPS position, a street address, zip code(s), city (or cities), county (or counties), combinations thereof, and/or the like. Banking data may comprise at least one reference to a bank, bank account, trust account, credit account, merchant exchange, combinations thereof, and/or the like. Tax data may comprise taxpayer identification data. Background data may comprise at least one result from at least one background check, extended background check, combinations thereof, and/or the like. Employee data may comprise data related to employees of at least one third-party contractor. Skill set data may comprise data related to at least one skill. Skill set data may comprise at least one core competency. Skill set data may comprise an acknowledgement of at least one of a plurality of specific skill sets. Equipment data may comprise data on at least one tool, at least one vehicle, at least one piece of equipment, combinations thereof, and/or the like accessible by at least one third-party contractor. Training data may comprise data on at least one training class, training session, and/or training certification attended or achieved by a third-party contractor. Contractor requirement data may comprise at least one response to a contractor requirement. Drug test data may comprise at least one result for at least one basic and/or extended drug test.

According to some of the various embodiments, at least some contractor data may be sourced and/or communicated from a fourth party such as a certification agency, a licensing body, an insurance provider, combinations thereof, and/or the like. For example, one of a plurality of third-party contractors may provide a license number. The license number may be used to verify a current license with the fourth party (for example a government office and/or a licensing body).

According to some of the various embodiments, at least one certification computer system 150 may be programmed to transform at least a portion of contractor data (180, 181 . . . 189) into certification data 152. Certification data 152 may comprise at least one certification. The at least one certification computer system 150 may be programmed to communicate the certification data 152 to at least one data storage device 140. The at least one certification computer system 150 may be programmed to update a least a portion of certification data 141 stored in the at least one data storage device 140. The at least one certification computer system 150 may be programmed to retrieve the certification data 141 from the at least one data storage device 140.

According to some of the various embodiments, computer system network 100 may comprise at least one e-commerce computer system 110, and at least one purchaser computer system 130. The at least one e-commerce computer system 110 and the at least one purchaser computer system 130 may communicate through employment of a global computer network. The e-commerce computer system 110 may be programmed to communicate at least one product with at least one contractor service 111 to at least one of the at least one purchaser computer system 130. At least one of the at least one purchaser computer system 130 may be programmed to accept selection of at least one of the at least one product with at least one contractor service 111 from a purchaser employing one of the at least one purchaser computer system 130. The at least one purchaser computer system 130 may be programmed to communicate selection of at least one purchase 131 to one of the at least one e-commerce computer system 110.

According to some of the various embodiments, at least one e-commerce computer system 110 may communicate with at least one certification computer system 150 through employment of a global computer network. The at least one e-commerce computer system 110 may be programmed to communicate at least one electronic service request 112 to the at least one certification computer system 150. The at least one electronic service request 112 may be based, at least in part, on a purchase of at least one product with at least one contractor service 131. The purchase may comprise a completed financial transaction. The purchase of the at least one product may be transacted simultaneously (or near simultaneously) with the purchase of the at least one contractor service. The at least one product may comprise a new product, a retail product, a product that may require at least one contractor service, combinations thereof, and/or the like. The at least one electronic service request 112 may be based, at least in part, on the purchase 131 placed through employment of an application, website, digital portal, Application Programming Interface (API), combinations thereof, and/or the like provided by the at least one e-commerce computer system 110. The at least one purchase 131 may be based, at least in part, on a scan of a UPC (Universal Product Code), a QR (Quick Response) code, or a barcode on a product, product packaging, product card, product advertisement, contractor service card, contractor service advertisement, combinations thereof, and/or the like. The scan may be electronically communicated to the at least one e-commerce computer system 110. Electronic service request 112 may comprise service data for at least one contractor service. Electronic service request 112 may comprise at least one target service date and/or time period. Electronic service request 112 may comprise at least one service code.

According to some of the various embodiments, each of at least one service code may be mapped to a classification of service required. The at least one service code may be based, at least in part, on contractor service data 151 communicated from at least one certification computer system 150. A standardization of contractor services may comprise a plurality of service codes. At least one of the plurality of service codes may each comprise at least one task. At least one of the plurality of service codes may each comprise at least one non-task. A non-task is a task that may not be included in a contractor service and/or service code. The standardization may comprise a mapping of contractor services to service codes. A service code may be associated with a plurality of contractor services. The standardization may comprise a mapping of products to service codes. At least one of the plurality of service codes may comprise at least one additional task (in other words an add-on). The standardization may comprise at least one pricing standard. The at least one pricing standard may be based, at least in part, on at least one location, median income of the at least one location, skills required to complete at least one contractor service associated with a service code, an expected number of third-party contractors required to complete at least one contractor service associated with a service code, combinations thereof, and/or the like.

According to some of the various embodiments, at least one certification computer system 150 may be programmed to communicate at least one electronic service work order 153 to one (for example 171) of a plurality of contractor devices (170, 171 . . . 179). The at least one certification computer system 150 may be programmed to present the at least one electronic service work order 153 to an established network of certified contractors. Presentation of the at least one electronic service work order 153 may be viewed through employment of at least one of the plurality of contractor devices (170, 171 . . . 179). The established network of certified contractors may comprise at least a portion of a plurality of third-party contractors.

According to some of the various embodiments, at least one certification computer system 150 may be programmed to receive additional contractor data (180, 181 . . . 189) from at least some of a plurality of contractor devices (170, 171 . . . 179). The additional contractor data (180, 181 . . . 189) may comprise at least one contractor request. The at least one contractor request may comprise a request for consideration for selection of at least one contractor service. The at least one contractor request may comprise a name and/or identifier of at least one third-party contractor to perform the at least one contractor service. The at least one contractor request may comprise a bid for the at least one contractor service. The at least one contractor service may be associated with at least one electronic service work order 153. The bid may comprise a lower price than a contractor payment specified in the at least one electronic service work order 153. The lower price may comprise a labor price and/or a price for materials required to complete at least one contractor service. The bid may comprise an hourly rate and/or a fixed price for at least one contractor service. At least one of the at least one contractor request may comprise at least one proposed date and/or at least one proposed time. The proposed date may be associated with a start date and/or an end date for at least one contractor service. The proposed time may be associated with a start time and/or an end time for at least one contractor service. The at least one contractor request may comprise document(s), photo(s), comment(s), combinations thereof, and/or the like supporting other data provided in the at least one contractor request. Acceptance of the at least one contractor request by the at least one certification computer system 150 may be based, at least in part, on at least a portion of the additional contractor data (180, 181 . . . 189) and/or at least a portion of certification data 141.

Figure 2:
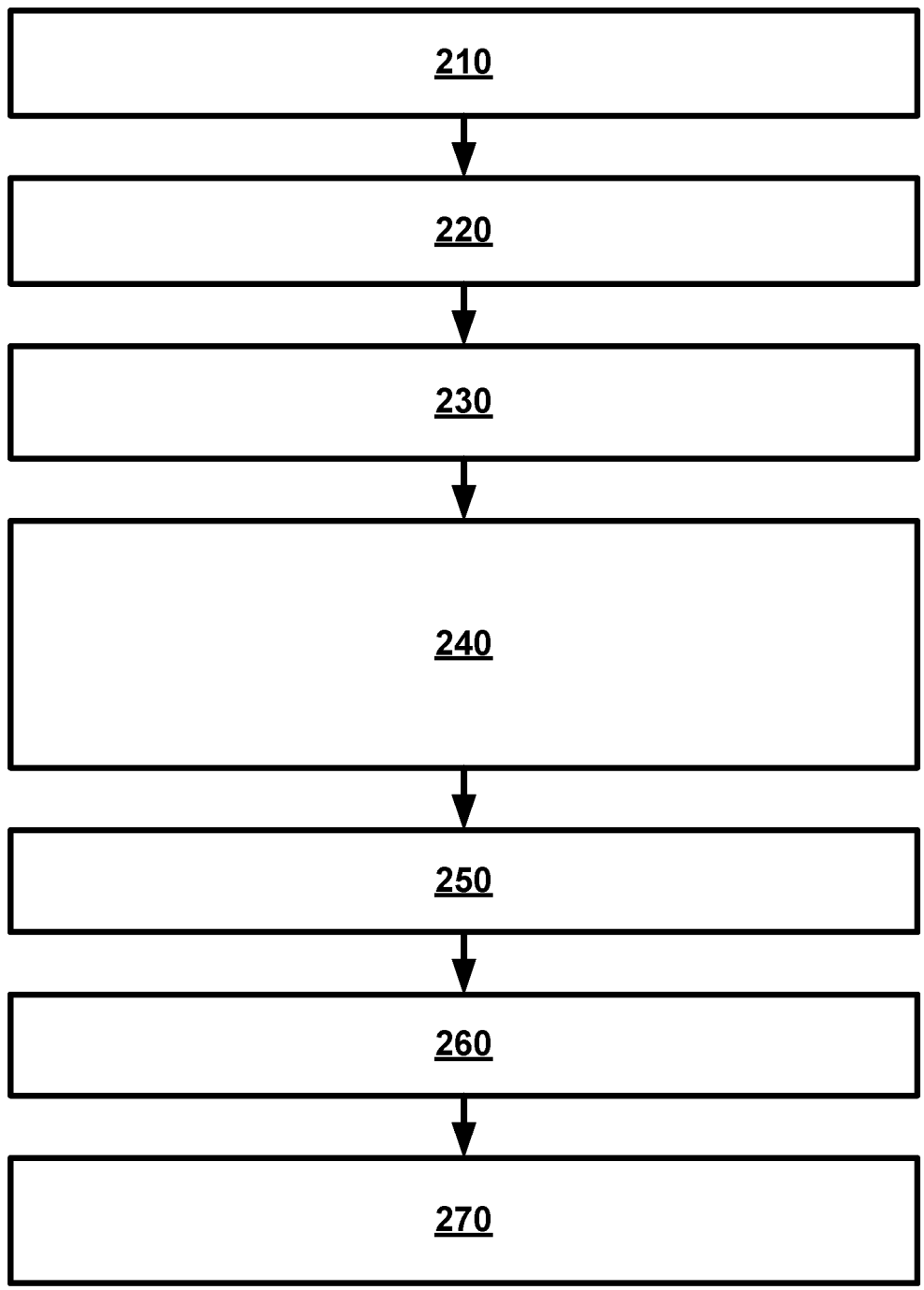
FIG. 2 is an example flow diagram of certifying third-party contractors as per an aspect of an embodiment.

FIG. 2 is an example flow diagram of certifying third-party contractors as per an aspect of an embodiment. A certification computer system (for example 150) may be programmed to perform a method of automatically certifying at least one third-party contractor to provide at least one contractor service with at least one product. The certification computer system (for example 150) may be programmed to perform the method of automatically certifying at least one third-party contractor according to third-party certification requirements provided by a manufacturer, wholesaler, merchant, retailer, e-commerce retailer, combinations thereof, and/or the like. The method performed by the certification computer system (for example 150) may comprise electronically receiving contractor data (for example 180, 181 . . . 189) at the certification computer system (for example 150) from a plurality of contractor devices (for example 170, 171 . . . 179) at 210. The method performed by the certification computer system (for example 150) may comprise electronically storing at least a portion of the contractor data (for example 180) as certification data (for example 152) in at least one of at least one data storage device (for example 140) at 220.

According to some of the various embodiments, a method performed by a certification computer system (for example 150) may comprise automatically certifying at least one of a plurality of third-party contractors as at least one certified contractor based, at least in part, on certification data (for example 141) at 230. At least some of the plurality of third-party contractors may be licensed contractors. Persons skilled in the art will recognize that licensed contractors may need additional certification to satisfy at least one contractor requirement. The method performed by the certification computer system (for example 150) may comprise automatically certifying at least a portion of the plurality of third-party contractors based at least in part on: the certification data (for example 141) and the at least one contractor requirement. The at least one contractor requirement may be electronically provided by a manager of an e-commerce computer system (for example 110). For example, the at least one contractor requirement may comprise a passing result of at least one electronic examination (for example 160). The at least one electronic examination (for example 160) may, for example, comprise questions with multichoice answers. The at least one electronic examination (for example 160) may, for example, be provided with at least one electronic source material. The at least one electronic source material may comprise electronic document(s), electronic manual(s), digital audio, digital video(s), digital photo(s), combinations thereof, and/or the like. The at least one contractor requirement may, for example, comprise a number of times an electronic examination (for example 160) may be taken. The at least one contractor requirement may, for example, comprise a minimum result for at least one electronic examination (for example 160). The at least one contractor requirement may, for example, comprise a minimum amount of professional experience. The at least one contractor requirement may, for example, comprise a request for results of an extended background check, an extended drug test, a combination thereof, and/or the like.

According to some of the various embodiments, a method performed by a certification computer system (for example 150) may comprise electronically updating certification data (for example 141) with at least one certification. The at least one certification may, for example, comprise a certification status, a certification type, a certification level, a group identifier, combinations thereof, and/or the like. The at least one certification may be based, at least in part, on at least one contractor requirement. The at least one certification may, for example, comprise a manufacturer certification, a product certification, a service certification, a task certification, an industry certification, combinations thereof, and/or the like. For example, the manufacturer certification may be based, at least in part, on result(s) of an electronic examination (for example 160) provided by a manufacturer to at least one third-party contractor. A product certification may, for example, be based, at least in part, on result(s) of an electronic examination (for example 160) based on at least one product. A product certification may, for example, be based, at least in part, on a minimum amount of professional experience with at least one product. A service certification may, for example, be based, at least in part, on a minimum amount of professional experience performing at least one contractor service. A task certification may, for example, be based, at least in part, on a minimum amount of professional experience performing at least one task.

According to some of the various embodiments, a method performed by a certification computer system (for example 150) may comprise electronically updating certification data (for example 141) with at least one completed job. The method performed by a certification computer system (for example 150) may comprise electronically updating certification data (for example 141) with a satisfaction rating. The satisfaction rating may be based, at least in part, on at least one consumer feedback survey received by the certification computer system (for example 150). The method performed by a certification computer system (for example 150) may comprise electronically updating certification data (for example 141) with a performance rating. The performance rating may be based, at least in part, on a historical data related to a performance of a third-party contractor. The performance rating may, for example, be based, at least in part, on a time to respond to at least one contractor request. The performance rating may, for example, be based, at least in part, on a time period to complete at least one previous job. The performance rating may, for example, be based, at least in part, on a certification request. The performance rating may, for example, be based, at least in part, on an amount of contractor data received. The performance rating may, for example, be based, at least in part, on at least one preference. The at least one preference may be based, at least in part, on contact data and/or banking data. The performance rating may, for example, be based, at least in part, on employee data. The performance rating may, for example, be based, at least in part, on bid data.

According to some of the various embodiments, a method performed by a certification computer system (for example 150) may comprise electronically testing at least one of a plurality of third-party contractors through employment of at least one electronic examination (for example 160). The at least one electronic examination (for example 160) may be accessible via the certification computer system (for example 150). At least one stored electronic examination (for example 145) may be retrieved by the certification computer system (for example 150) from at least one of at least one data storage device (for example 140). The at least one stored electronic examination (for example 145) retrieved from the at least one of at least one data storage device (for example 140) may be transformed by the certification computer system 150 into the at least one electronic examination (for example 160) communicated to at least one third-party contractor through employment of a contractor device (for example 170). A transformation of the at least one stored electronic examination (for example 145) may be based, at least in part, on certification data (for example 141), at least one electronic service request (for example 112), location data of the at least one third-party contractor, combinations thereof, and/or the like.

According to some of the various embodiments, a method performed by a certification computer system (for example 150) may comprise automatically certifying at least one of a plurality of third-party contractors as at least one certified contractor based, at least in part, on at least one result from at least one electronic examination (for example 160). The at least one result may be based, at least in part, on at least one electronic examination response (for example 190) from a contractor device (for example 170) associated with the at least one of the plurality of third-party contractors.

According to some of the various embodiments, a method performed by a certification computer system (for example 150) may comprise automatically selecting a certified contractor. Selection of the certified contractor may be based, at least in part, on certification data (for example 141). The method performed by the certification computer system (for example 150) may comprise automatically selecting the certified contractor based, at least in part, on location data. The location data may comprise data related to: a location of a purchaser, a location specified in an electronic service request (for example 112), a location that may be part of a list of locations available for contractor services, a location of a contractor service area, at least a part of the certification data (for example 141), combinations thereof, and/or the like. The location of a purchaser may, for example, comprise a GPS position, street address, zip code, city, county, combinations thereof, and/or the like. The location of the contractor service area may, for example, comprise a GPS position, street address, zip code, city, county, combinations thereof, and/or the like. The location data may be employed to filter through a plurality of certified contractors identified in the certification data (for example 141). The filter may be based, at least in part, on a location, a radius from a location, combinations thereof, and/or the like. The method performed by the certification computer system (for example 150) may comprise automatically selecting the certified contractor based, at least in part, on availability data. The availability data may comprise data related to availability of at least one certified contractor. The availability may be matched to one of at least one target service date and/or time period. The availability may be matched to one of at least one target service date and matched to at least one adjacent time period. The availability may, for example, be based, at least in part, on a number of jobs (scheduled and/or completed) per hour, day, week, combinations thereof, and/or the like. The availability may, for example, be based, at least in part, on a number of work hours per day (scheduled and/or completed) and/or work hours per week (scheduled and/or completed). The availability data may be communicated to the certification computer system (for example 150) as at least a part of contractor data (for example 180, 181 . . . 189). The method performed by the certification computer system (for example 150) may comprise automatically selecting the certified contractor based, at least in part, on job threshold data. The job threshold data may comprise data related to a job threshold. The job threshold may comprise a history of completed jobs. The history of completed jobs may be based, at least in part, on at least one contractor service type. The at least one contractor service type may, for example, comprise a category of contractor services (for example electrical) and/or at least one skill set associated with at least one category (for example residential electrical). The method performed by the certification computer system (for example 150) may comprise automatically selecting the certified contractor based, at least in part, on satisfaction rating data. The satisfaction rating data may comprise data related to a minimum satisfaction rating. The method performed by the certification computer system (for example 150) may comprise automatically selecting the certified contractor based, at least in part, on performance rating data. The performance rating data may comprise data related to at least one minimum performance rating. The method performed by the certification computer system (for example 150) may comprise automatically selecting the certified contractor based, at least in part, on expiration data. The expiration data may comprise data related to at least one expiration period. The expiration period may be calculated from the time an electronic service work order (for example 153) is created or communicated to at least one (for example 171) of a plurality of contractor devices (for example 170, 171 . . . 179). The expiration period may comprise a fixed or dynamic number of hours or days. For example, if no certified contractor has been selected at the end of an expiration period comprising 48 hours, a geographic search area (for example number of zip codes, radius from city center, radius from location, etc.) may be increased. For example, if no certified contractor has been selected at the end of an expiration period comprising 3 days, at least one job threshold may be temporarily or permanently reduced. For example, if no certified contractor has been selected at the end of an expiration period comprising 24 hours, the minimum for at least one satisfaction rating and/or performance rating may be temporarily or permanently reduced. For example, if no certified contractor has been selected at the end of an expiration period comprising 1 day, at least one commission fee may be reduced. For example, if no certified contractor has been selected at the end of an expiration period comprising 36 hours, a payment offered to at least one contractor for at least one contractor service may be increased.

According to some of the various embodiments, a method performed by a certification computer system (for example 150) may comprise electronically receiving an electronic service request (for example 112) at 240. The electronic service request (for example 112) may be communicated from an e-commerce computer system (for example 110) to the certification computer system (for example 150). The electronic service request (for example 112) may be based, at least in part, on at least one purchase (for example 131) of at least one product with at least one contractor service (for example 111). The at least one purchase may be made in electronic communication with a purchaser computer system (for example 130). The e-commerce computer system (for example 110) may be managed, for example, by a manufacturer, wholesaler, merchant, retailer, e-commerce retailer, combinations thereof, and/or the like. A purchaser may employ at least one purchaser computer system (for example 130) to complete the at least one purchase (for example 131). The purchaser may, for example, be a consumer (for example residential, wholesale, commercial, and/or business).

According to some of the various embodiments, an electronic service request (for example 112) may comprise purchaser data, product data, service data, combinations thereof, and/or the like. The purchaser data may comprise location data. The location data may comprise a GPS position, a mailing address, a delivery address, a billing address, combinations thereof, and/or the like. The product data may comprise at least one product code (for example a SKU). The service data may comprise at least one service code (for example a SKU). The electronic service request (for example 112) may comprise service data on at least one contractor service. The at least one contractor service may comprise at least one measurement, an installation, an assembly, a delivery, an inspection, a warranty certification, a repair under warranty, a replacement under warranty, combinations thereof, and/or the like. The at least one measurement may be associated with a proposed installation of at least one product. The at least one product may comprise a new product, a factory refurbished product, a third party refurbished product, a dealer refurbished product, a distributor refurbished product, an open box product, new old stock, a used product, combinations thereof, and/or the like. The inspection may be associated with a proposed installation of the at least one product. The warranty certification may be associated with an installed product and/or installation of the at least one product. The repair under warranty may be associated with an installed product. The replacement under warranty may be associated with an installed product and the at least one product.

According to some of the various embodiments, a method performed by a certification computer system (for example 150) may comprise automatically creating an electronic service work order (for example 153) at 250. The electronic service work order (for example 153) may be based, at least in part, on an electronic service request (for example 112). The electronic service work order (for example 153) may comprise service work order data. The service work order data may comprise at least a portion of purchaser data, at least a portion of product data, at least a portion of service data, at least a portion of contractor payment data, combinations thereof, and/or the like. The purchaser data may comprise contact data for a purchaser. The contact data may be provided by the purchaser through employment of a purchaser computer system (for example 130). The contact data may be downloaded from a data storage device accessible by an e-commerce computer system (for example 110). The data storage device (for example 110) may comprise account data associated with the purchaser. Product data may comprise data on at least one purchased product. Service data may comprise data on at least one purchased contractor service. Contractor payment data may comprise a payment offered for at least one certified contractor for completing at least one contractor service. The electronic service work order (for example 153) may comprise installation instructions provided by at least one manufacturer, assembly instructions provided by at least one manufacturer, warranty data for at least one product and/or service, task data, combinations thereof, and/or the like. The task data may be associated with tasks required for at least one of the at least one purchased contractor service. The task data may be associated with tasks not included with at least one of the at least one purchased contractor service. The electronic service work order (for example 153) may comprise a Turn Around Time (TAT) goal. A Turn Around Time goal may comprise a time duration starting at time of purchase of the at least one purchased contractor service to time of completion of the at least one purchased contractor service. The time of completion may be communicated from a contractor device (for example 171) to the certification computer system (for example 150).

According to some of the various embodiments, a method performed by a certification computer system (for example 150) may comprise automatically selecting a certified contractor from at least two certified contractors at 260. The method performed by the certification computer system (for example 150) may comprise electronically communicating an electronic service work order (for example 153) to the certified contractor at 270. The certified contractor may receive the electronic service work order (for example 153) through employment of at least one contractor device (for example 171). The at least one contractor device (for example 171) may comprise multiple devices such as server(s), computer(s), mobile device(s), wearable device(s), combinations thereof, and/or the like.

According to some of the various embodiments, a method performed by a certification computer system (for example 150) may comprise electronically communicating an electronic service work order (for example 153) to at least one certified contractor. Each of the at least one certified contractor may employ at least one of a plurality of contractor devices (for example 170, 171 . . . 179) to view the electronic service work order (for example 153). The method performed by the certification computer system (for example 150) may comprise receiving at least one electronic service work order response from at least one of the at least one certified contractor. Each of the at least one electronic service work order response may comprise identification data of at least one responding certified contractor. The method performed by the certification computer system (for example 150) may comprise automatically selecting a certified contractor from at least one responding certified contractor. Selection of the certified contractor may be based, at least in part, on an order of electronic service work order responses received.

According to some of the various embodiments, a method performed by a certification computer system (for example 150) may comprise electronically communicating an electronic service order confirmation to a purchaser. The purchaser may employ a purchaser computer system (for example 130). The purchaser computer system (for example 130) may comprise multiple devices such as server(s), computer(s), mobile device(s), wearable device(s), combinations thereof, and/or the like. Electronically communicating an electronic service order confirmation may comprise a mobile phone number, a mobile identification number, an email address, an IP address, a URL, combinations thereof, and/or the like. The method performed by the certification computer system (for example 150) may comprise electronically communicating a consumer feedback survey to the purchaser. The consumer feedback survey may be electronically communicated with a service receipt. The method performed by the certification computer system (for example 150) may comprise electronically receiving consumer feedback survey data from the purchaser computer system (for example 130). The consumer feedback survey data may, for example, comprise at least one satisfaction rating for at least one third-party contractor and/or purchased contractor service.

According to some of the various embodiments, a method performed by a certification computer system (for example 150) may comprise electronically receiving shipping data from an e-commerce computer system (for example 110). The method performed by a certification computer system (for example 150) may comprise electronically receiving at least one shipping update from an e-commerce computer system (for example 110). One of the at least one shipping update may comprise delivery data of at least one product. The shipping data may, for example, comprise tracking data, delivery confirmation data, contracted shipping company data, combinations thereof, and/or the like.

According to some of the various embodiments, a method performed by a certification computer system (for example 150) may comprise electronically receiving service progress data from at least one of a plurality of contractor devices (for example 171). The service progress data may be associated with at least one contractor service specified in an electronic service work order (for example 153). The service progress data may comprise at least one service date. The service progress data may comprise data associated with at least one closing event. The at least one closing event may comprise closing data required by a certified contractor to validate completion of at least one contractor service. The closing data may comprise a code, a photographic file, time spent on site, at least one completed task, at least one additional task required to complete the at least one completed task, at least one expense, combinations thereof, and/or the like. At least one closing event may be required prior to releasing funds paid by a purchaser to the certified contractor for completing at least a portion of at least one of the at least one contractor service. Funds may be held by a manager of an e-commerce computer system, a merchant exchange carrier, a contractor service provider, combinations thereof, and/or the like. The funds may be held in an electronically accessible escrow trust account. The funds may be electronically transferred to the certified contractor through employment of banking data.

According to some of the various embodiments, a method performed by a certification computer system (for example 150) may comprise automatically generating a contractor network report. The contractor network report may comprise performance data for at least one certified contractor and/or an established network of certified contractors. The established network of certified contractors may comprise at least a portion of a plurality of third-party contractors. The established network of certified contractors may be based, at least in part, on at least one contractor requirement. The performance data may, for example, comprise at least one average fulfillment rate, at least one average time to assignment, an average cost of at least one contractor service, combinations thereof, and/or the like. The contractor network report may comprise service data related to at least one electronic service request (for example 112), at least one service code, combinations thereof, and/or the like. The method performed by a certification computer system (for example 150) may comprise electronically communicating the contractor network report to a manager of an e-commerce computer system (for example 110). Electronically communicating the contractor network report may comprise a mobile phone number, a mobile identification number, an email address, an IP address, a URL, combinations thereof, and/or the like.

According to some of the various embodiments, a tangible, non-transitory data storage medium may comprise an indicia of instructions for a certification computer system 150 to perform an automated method of certifying at least one third-party contractor to provide at least one contractor service with at least one product. The certification computer system 150 may be coupled to a global computer network with access to at least one data storage device 140. The automated method performed according to the instructions may comprise electronically receiving contractor data (180, 181 . . . 189) at the certification computer system 150 from a plurality of contractor devices (170, 171 . . . 179). The automated method performed according to the instructions may comprise electronically storing the contractor data (180, 181 . . . 189) as certification data 152 in at least one of the at least one data storage device 140. The automated method performed according to the instructions may comprise automatically certifying at least one of a plurality of third-party contractors as at least one certified contractor based, at least in part, on certification data 141. The automated method performed according to the instructions may comprise electronically receiving an electronic service request 112 communicated from an e-commerce computer system 110 to the certification computer system 150. The electronic service request 112 may be based, at least in part, on at least one purchase of at least one product with at least one contractor service 131 made in electronic communication with a purchaser computer system 130. The automated method performed according to the instructions may comprise automatically creating an electronic service work order 153 based, at least in part, on the electronic service request 112. The automated method performed according to the instructions may comprise automatically selecting a certified contractor from the at least one certified contractor. The automated method performed according to the instructions may comprise electronically communicating the electronic service work order 153 to the certified contractor. The certified contractor may employ at least one contractor device 171 to receive the electronic service work order 153.

Figure 3:
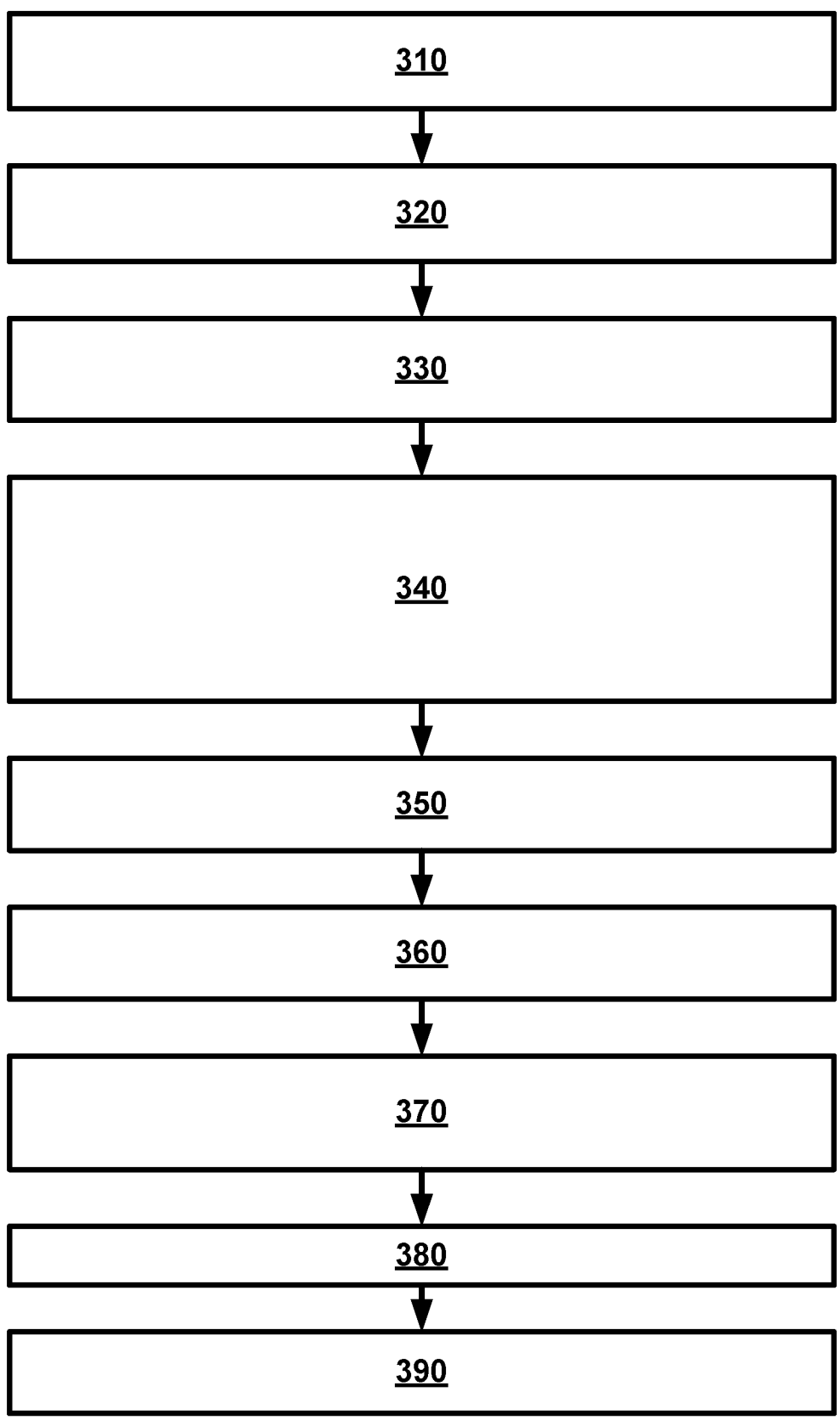
FIG. 3 in an example flow diagram of certifying partially-certified contractors as per an aspect of an embodiment.

FIG. 3 in an example flow diagram of certifying partially-certified contractors as per an aspect of an embodiment. A method performed by a certification computer system (for example 150) may comprise electronically receiving contractor data (for example 180, 181 . . . 189) at the certification computer system (for example 150) from a plurality of contractor devices (for example 170, 171 . . . 179) at 310. The method performed by the certification computer system (for example 150) may comprise electronically storing at least a portion of the contractor data (for example 180, 181 . . . 189) as certification data (for example 152) in at least one of at least one data storage device (for example 140) at 320.

According to some of the various embodiments, a method performed by a certification computer system (for example 150) may comprise partially certifying, automatically, at least one of a plurality of third-party contractors as at least one partially-certified contractor based, at least in part, on certification data (for example 141) at 330. The method performed by the certification computer system (for example 150) may comprise partially certifying, automatically, at least one of the plurality of third-party contractors based at least in part on: the certification data (for example 141) and at least one contractor requirement. The method performed by the certification computer system (for example 150) may comprise electronically receiving an electronic service request (for example 112) communicated from an e-commerce computer system (for example 110) to the certification computer system (for example 150) at 340. The electronic service request (for example 112) may be based, at least in part, on at least one purchase (for example 131) of at least one product with at least one contractor service (for example 111) made in electronic communication with a purchaser computer system (for example 130). The method performed by the certification computer system (for example 150) may comprise automatically creating an electronic service work order (for example 153) based, at least in part, on the electronic service request (for example 112) at 350. The method performed by the certification computer system (for example 150) may comprise electronically communicating at least one certification request (for example 129) to the at least one partially-certified contractor at 360. The at least one partially-certified contractor may be selected from a plurality of partially-certified contractors based, at least in part, on the length of time expected to complete the at least one certification request (for example 129). The at least one certification request (for example 129) may comprise at least one stored electronic examination (for example 145) accessible via the certification computer system (for example 150). The at least one certification request (for example 129) may be based, at least in part, on the certification data (for example 141), service data from an electronic service request (for example 112), an electronic service work order (for example 153), combinations thereof, and/or the like. The at least one certification request (for example 129) may be communicated to the at least one partially-certified contractor at least one additional time until at least one electronic response to the at least one certification request (for example 129) is received.

According to some of the various embodiments, a method performed by a certification computer system (for example 150) may comprise automatically certifying at least one partially-certified contractor as at least one certified contractor based, at least in part, on at least one electronic response to at least one certification request (for example 129) at 370. The at least one partially-certified contractor may be a member of an established network of partially-certified contractors. The established network of partially-certified contractors may comprise at least a portion of a plurality of third-party contractors. The established network of partially-certified contractors may be based, at least in part, on at least one contractor requirement. The established network of partially-certified contractors may be based, at least in part, on at least one electronic response to at least one electronic invitation. The method performed by a certification computer system (for example 150) may comprise automatically receiving at least one bid from at least one partially-certified contractor. The at least one bid may be submitted in at least one electronic reverse auction. The at least one partially-certified contractor may be a member of at least one established network of partially-certified contractors. The at least one electronic response may be electronically communicated from at least one (for example 179) of a plurality of contractor devices (for example 170, 171 . . . 179) to the certification computer system (for example 150). The method performed by the certification computer system (for example 150) may comprise automatically selecting a certified contractor from the at least one certified contractor at 380. Selection of the certified contractor may be based, at least in part, on an order of electronic responses received. The method performed by the certification computer system (for example 150) may comprise electronically communicating an electronic service work order (for example 153) to the certified contractor at 390.

According to some of the various embodiments, a method performed by a certification computer system (for example 150) may comprise automatically updating certification data (for example 141) with at least one partial certification. The method performed by the certification computer system (for example 150) may comprise automatically updating certification data (for example 141) with at least one certification. The method performed by the certification computer system (for example 150) may comprise automatically updating certification data (for example 141) with at least one additional contractor service type. The at least one additional contractor service type may be related to an existing contractor service type. For example, third-party contractors certified as residential electricians may be able to accept electronic service work orders (for example 153) for electrical tasks on new and/or existing air conditioning systems and/or components.

According to some of the various embodiments, a method performed by a certification computer system (for example 150) may comprise partially certifying, automatically, at least one of a plurality of third-party contractors as at least one partially-certified contractor based, at least in part, on at least one result from at least one electronic examination (for example 160). The at least one result may be based, at least in part, on at least one electronic examination response (for example 190) from a contractor device (for example 170) associated with the at least one of the plurality of third-party contractors. The method performed by the certification computer system (for example 150) may comprise electronically testing at least one of the at least one partially-certified contractor through employment of at least one electronic examination (for example 160). The at least one electronic examination (for example 160) may be accessible via the certification computer system (for example 150). The method performed by the certification computer system (for example 150) may comprise automatically certifying at least one of the at least one partially-certified contractor based, at least in part, on at least one result from at least one electronic examination (for example 160).

According to some of the various embodiments, a tangible, non-transitory data storage medium may comprise an indicia of instructions for a certification computer system 150 to perform an automated method of certifying at least one third-party contractor to provide at least one contractor service with at least one product. The certification computer system 150 may be coupled to a global computer network with access to at least one data storage device 140. The automated method performed according to the instructions may comprise electronically receiving contractor data (180, 181 . . . 189) at the certification computer system 150 from a plurality of contractor devices (170, 171 . . . 179). The automated method performed according to the instructions may comprise electronically storing the contractor data (180, 181 . . . 189) as certification data 152 in at least one of the at least one data storage device 140. The automated method performed according to the instructions may comprise partially certifying, automatically, at least one of a plurality of third-party contractors as at least one partially-certified contractor based, at least in part, on certification data 141. The automated method performed according to the instructions may comprise electronically receiving an electronic service request 112 communicated from an e-commerce computer system 110 to the certification computer system 150. The electronic service request 112 may be based, at least in part on, at least one purchase 131 of at least one product with at least one contractor service 111 made in electronic communication with a purchaser computer system 130. The automated method performed according to the instructions may comprise automatically creating an electronic service work order 153 based, at least in part, on the electronic service request 112. The automated method performed according to the instructions may comprise electronically communicating at least one certification request 129 to the at least one partially-certified contractor. The automated method performed according to the instructions may comprise automatically certifying at least one of the at least one partially-certified contractor as at least one certified contractor based, at least in part, on a certification response to at least one of the at least one certification request 129. The automated method performed according to the instructions may comprise automatically selecting a certified contractor from the at least one certified contractor. The automated method performed according to the instructions may comprise electronically communicating the electronic service work order 153 to the certified contractor. The certified contractor may employ at least one contractor device 171 to receive the electronic service work order 153.

According to some of the various embodiments, a method performed by a certification computer system (for example 150) may comprise automatically selecting a first certified contractor for each location in a plurality of locations. Selection of the first certified contractor may be based, at least in part, on skill set data, wholesale price data, satisfaction rating data, performance rating data, job threshold data, certification data (for example 141), combinations thereof, and/or the like. The wholesale price data may comprise data related to at least one price a certified contractor desires to complete at least one contractor service. The method performed by a certification computer system (for example 150) may comprise automatically selecting a second certified contractor for at least one location in the plurality of locations. Selection of the second certified contractor may be based, at least in part, on skill set data, wholesale price data, satisfaction rating data, performance rating data, job threshold data, certification data (for example 141), combinations thereof, and/or the like. The method performed by the certification computer system (for example 150) may comprise automatically selecting a third certified contractor for at least one location in the plurality of locations. Selection of the third certified contractor may be based, at least in part, on skill set data, wholesale price data, satisfaction rating data, performance rating data, job threshold data, certification data (for example 141), combinations thereof, and/or the like. The method performed by the certification computer system (for example 150) may comprise electronically communicating a first amount (for example 153) of a plurality of electronic service work orders to the first certified contractor. The first certified contractor may employ at least one contractor device (for example 171) to receive the first amount (for example 153) of a plurality of electronic service work orders. The first amount may comprise a fixed percentage, a dynamic percentage, a fixed number, a dynamic number, at least one result from an automated optimization process, combinations thereof, and/or the like. The first amount may be based, at least in part, on at least a portion of certification data (for example 141), at least one electronic service request (for example 112), availability of the first certified contractor, an expiration period, combinations thereof, and/or the like. The automated optimization process may be configured to compute an amount based, at least in part, on skill set data, wholesale price data, satisfaction rating data, performance rating data, job threshold data, certification data, contractor data, service data, contractor service data, location data, availability data, expiration data, product data, service work order data, service progress data, performance data, combinations thereof, and/or the like. The method performed by the certification computer system (for example 150) may comprise electronically communicating a second amount of a plurality of electronic service work orders to the second certified contractor. The second amount may comprise a fixed percentage, a dynamic percentage, a fixed number, a dynamic number, at least one result from an automated optimization process, combinations thereof, and/or the like. The second amount may be based, at least in part, on at least a portion of certification data (for example 141), the at least one electronic service request (for example 112), availability of the first and/or second certified contractor, an expiration period, combinations thereof, and/or the like. At least one electronic service work order may be electronically communicated to the third certified contractor when the first certified contractor and the second certified contractor have no availability and/or are not expected to meet a service goal. The service goal may, for example, comprise a TAT, a service price, a satisfaction rating, a performance rating, combinations thereof, and/or the like. The method performed by the certification computer system (for example 150) may comprise automatically selecting the first certified contractor, the second certified contractor, and/or the third certified contractor from an established network of certified contractors. According to an embodiment, additional certified contractors may be selected.

According to some of the various embodiments, an established network of certified contractors may comprise at least a portion of a plurality of third-party contractors. The established network of certified contractors may be based, at least in part, on at least a portion of certification data (for example 141). The established network of certified contractors may be based, at least in part, on electronic responses to at least one electronic invitation. The electronic responses may be communicated as part of contractor data (for example 180, 181 . . . 189) from a plurality of contractor devices (for example 170, 171 . . . 179). The at least one electronic invitation may comprise service data from an electronic service request (for example 112). A method performed by a certification computer system (for example 150) may comprise automatically receiving at least one bid from at least one certified contractor. The at least one bid may be submitted in at least one electronic reverse auction. The at least one certified contractor may be a member of at least one established network of certified contractors. A bid may, for example, comprise at least one date, at least one time, at least one availability, a price for at least one contractor service, combinations thereof, and/or the like.

According to some of the various embodiments, a tangible, non-transitory data storage medium may comprise an indicia of instructions for a certification computer system 150 to perform an automated method of selecting at least one certified contractor to provide at least one contractor service with at least one product. The automated method performed according to the instructions may comprise automatically selecting a first certified contractor for each location in a plurality of locations. The automated method performed according to the instructions may comprise automatically selecting a second certified contractor for at least one location in the plurality of locations. The automated method performed according to the instructions may comprise automatically selecting a third certified contractor for at least one location in the plurality of locations. The automated method performed according to the instructions may comprise electronically communicating a first amount 153 of a plurality of electronic service work orders to the first certified contractor. The first certified contractor may employ at least one contractor device 171 to receive the first amount 153 of a plurality of electronic service work orders. The automated method performed according to the instructions may comprise electronically communicating a second amount of a plurality of electronic service work orders to the second certified contractor. The automated method performed according to the instructions may comprise electronically communicating at least one electronic service work order to the third certified contractor when the first certified contractor and the second certified contractor are not expected to meet a service goal. The automated method performed according to the instructions may comprise automatically selecting the first certified contractor, the second certified contractor, and/or the third certified contractor from an established network of certified contractors.

According to some of the various embodiments, a method performed by a certification computer system (for example 150) may comprise receiving time bucket data from one (for example 170) of a plurality of contractor devices (for example 170, 171 . . . 179). The time bucket data may be communicated as at least a portion of contractor data (for example 180). The time bucket data may be at least a portion of availability data. The time bucket data may comprise a plurality of time buckets. Each of the plurality of time buckets may comprise a time period during a work day or a work week. The period of time may, for example, comprise a period of 1 to 24 hours or 1 to 7 days. The period of time may be defined by the certification computer system (for example 150), an e-commerce computer system (for example 110), a certified contractor employing one (for example 170) of a plurality of contractor devices (for example 170, 171 . . . 179), combinations thereof, and/or the like. The time bucket data may comprise a number of jobs the certified contractor is willing to schedule for each of the plurality of time buckets. The number of jobs may be specific to a particular set of tasks required for at least one contractor service. The number of jobs may be specific to a particular contractor service type. The time bucket data may be communicated to the certification computer system (for example 150) on a daily, weekly, and/or monthly basis.

According to some of the various embodiments, a method performed by a certification computer system (for example 150) may comprise electronically communicating a first amount (for example 153) of a plurality of electronic service work orders to a first certified contractor until at least one time bucket for the first certified contractor is full. The method performed by a certification computer system (for example 150) may comprise electronically communicating a second amount of a plurality of electronic service work orders to a second certified contractor until at least one time bucket for the second certified contractor is full and so on.

According to some of the various embodiments, a tangible, non-transitory data storage medium may comprise an indicia of instructions for a certification computer system 150 to perform an automated method of selecting at least one certified contractor to provide at least one contractor service with at least one product. The automated method performed according to the instructions may comprise electronically receiving time bucket data from at least one contractor device of a plurality of contractor devices (170, 171 . . . 179). The automated method performed according to the instructions may comprise electronically communicating a first amount of a plurality of electronic service work orders (for example 153) to a first certified contractor until at least one time bucket for the first certified contractor is full. The automated method performed according to the instructions may comprise electronically communicating a second amount of a plurality of electronic service work orders to a second certified contractor until at least one time bucket for the second certified contractor is full and so on.

Figure 4:
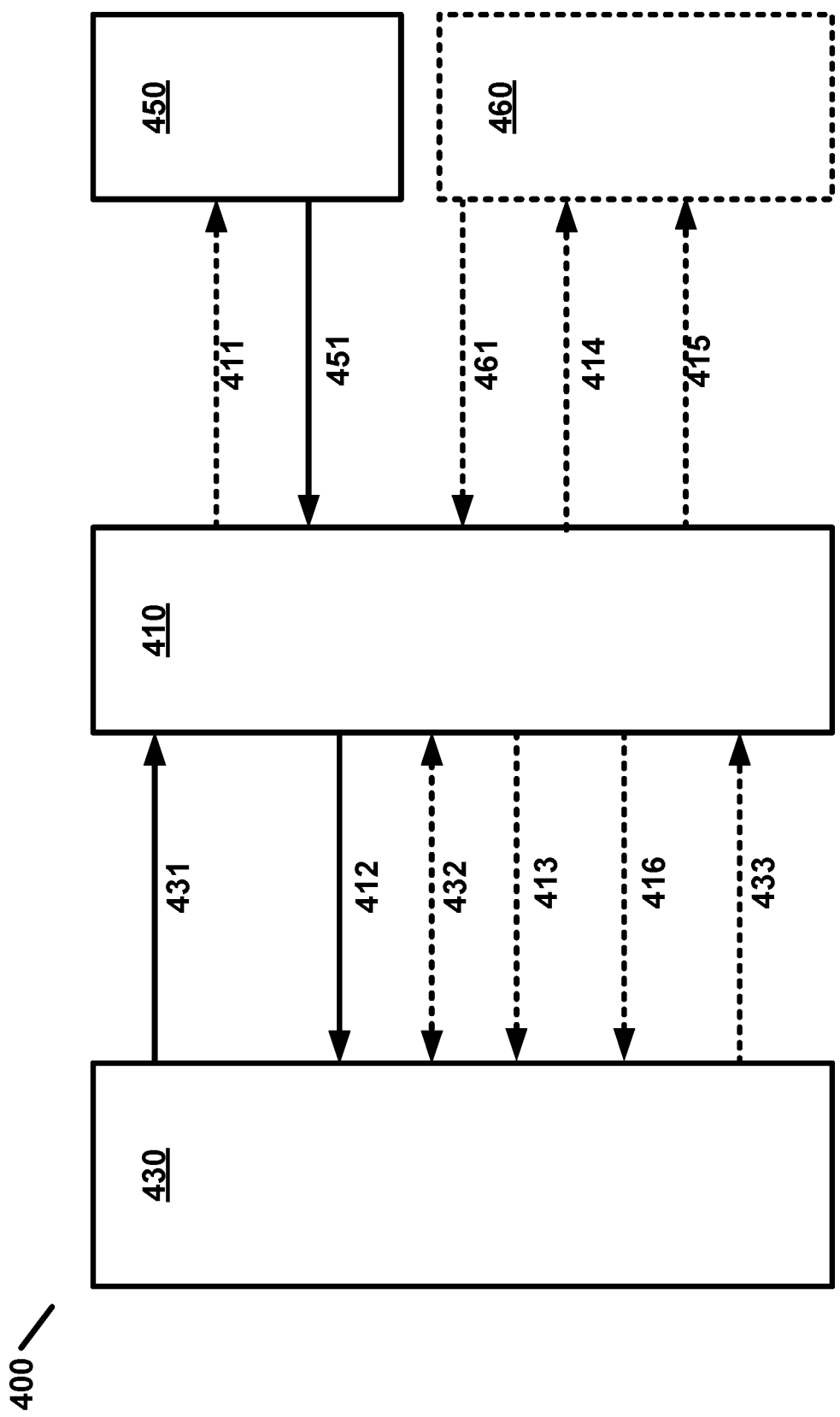
FIG. 4 is an example block diagram showing an e-commerce computer system network as per an aspect of various embodiments.

FIG. 4 is an example block diagram showing an e-commerce computer system network 400 as per an aspect of various embodiments. The e-commerce computer system network 400 may comprise at least one e-commerce computer system 410, at least one purchaser computer system 430, and at least one mapping computer system 450. The at least one e-commerce computer system 410, at least one purchaser computer system 430, and at least one mapping computer system 450 may communicate through employment of a global computer network (for example the Internet). Communication through employment of the global computer network may further employ at least one application, webpage, digital portal, Application Programming Interface (API), electronic message, digital file, combinations thereof, and/or the like.

According to some of the various embodiments, at least one e-commerce computer system 410 may be programmed to communicate a plurality of product codes 411 to at least one mapping computer system 450. The at least one mapping computer system 450 may be programmed to search the at least one e-commerce computer system 410 for the plurality of product codes 411. For example, the at least one mapping computer system 450 may be programmed to search at least one webpage presented by the at least one e-commerce computer system 410. The at least one webpage may comprise instructions configured to present data associated with a plurality of products. According to some of the various embodiments, each of the plurality of product codes 411 may represent a product for sale, a set of products for sale, combinations thereof, and/or the like.

According to some of the various embodiments, at least one mapping computer system 450 may be programmed to map each of at least some of a plurality of product codes to one of a plurality of service codes. At least one e-commerce computer system 410 may be programmed to receive the plurality of service codes 451 from the at least one mapping computer system 450. Each of the plurality of service codes 451 may be mapped to at least one of the plurality of product codes 411. Each of the plurality of service codes 451 may be associated with one product or a set of products. Each of the plurality of service codes 451 may be based, at least in part, on at least one contractor service.

According to some of the various embodiments, at least one contractor service may be based, at least in part, on at least a portion of product data (for example data comprising the type of product), measurement required, installation required, assembly required, inspection required, at least one task required, at least one non-task, combinations thereof, and/or the like. The at least one contractor service may be configured to be performed by a third-party contractor. At least some of a plurality of service codes may be based, at least in part, on location data electronically communicated from a purchaser computer system 430 and/or contact data of a purchaser employing the purchaser computer system 430. A location of the purchaser computer system 430 may be determined at least in part through employment of a browser setting, an IP address, GPS position data, at least one Wi-Fi network, combinations thereof, and/or the like. Each of the plurality of service codes may relate to at least one service price. The at least one service price may be based, at least in part, on the location data and/or the contact data. The at least one service price may be based, at least in part, on the at least one contractor service. The at least one service price may be based, at least in part, on a contract with at least one certified contractor.

According to some of the various embodiments, at least one e-commerce computer system 410 may be programmed to receive a selection of at least one product with at least one contractor service 431 from a purchaser computer system 430. The selection from the purchaser computer system 430 may comprise selection of an electronic button, a voice command, a gesture, combinations thereof, and/or the like. The selection may comprise a single selection. The electronic button may be presented through employment of at least one: widget, application, script, plug-in to an application, URL, API, combinations thereof, and/or the like. The electronic button may be based, at least in part, on at least one service code and/or at least one contractor service. A description of the electronic button may be based, at least in part, on at least one service code and/or at least one contractor service. A description of the electronic button may be based, at least in part, on a price for at least one contractor service. The electronic button may be presented after an electronic validation procedure is automatically executed. The electronic validation procedure may be configured to validate a user, a location, billing data, combinations thereof, and/or the like. The at least one e-commerce computer system 410 may be programmed to create an electronic shopping cart for a purchaser employing the purchaser computer system 430. The at least one e-commerce computer system 410 may be programmed to place a product code for the at least one product in the electronic shopping cart. The at least one e-commerce computer system 410 may be programmed to place a service code for the at least one contractor service in the electronic shopping cart. The product code and the service code may be placed in the electronic shopping cart simultaneously (or near simultaneously). The at least one e-commerce computer system 410 may be programmed to create the electronic shopping cart comprising the product code and the service code. A combination code may represent the product code and the service code. The at least one e-commerce computer system 410 may be programmed to place the combination code in the electronic shopping cart. The at least one e-commerce computer system 410 may be programmed to create the electronic shopping cart comprising the combination code. The at least one e-commerce computer system 410 may be programmed to present the electronic shopping cart with the product code and the service code (or the combination code) 412 to the purchaser computer system 430. The electronic shopping cart may be presented through employment of at least one: widget, application, script, plug-in to an application, URL, API, combinations thereof, and/or the like.

According to some of the various embodiments, at least one e-commerce computer system 410 may be programmed to complete a shopping cart transaction with a purchaser computer system 430. The purchaser computer system 430 may be programmed to complete the shopping cart transaction with the at least one e-commerce computer system 410. The shopping cart transaction may comprise a single transaction. The at least one e-commerce computer system 410 may be programmed to receive terms of service 461 from at least one service processing computer system 460. The at least one e-commerce computer system 410 may be programmed to communicate the terms of service 413 to the purchaser computer system 430. The at least one e-commerce computer system 410 may be programmed to receive acceptance of the terms of service 433 from the purchaser computer system 430. The at least one e-commerce computer system 410 may be programmed to communicate the acceptance of the terms of service 414 to the at least one service processing computer system 460.

According to some of the various embodiments, at least one e-commerce computer system 410 may be programmed to communicate at least one electronic service request 415 to at least one service processing computer system 460. The at least one electronic service request 415 may be based, at least in part, on a purchase of at least one product with at least one contractor service 431. The purchase of the at least one product may be transacted simultaneously (or near simultaneously) with the purchase of the at least one contractor service. The purchase may be placed through employment of an application, webpage, digital portal, Application Programming Interface (API), combinations thereof, and/or the like provided by the at least one e-commerce computer system 410. The purchase may be based, at least in part, on a scan of a UPC, a QR code, or a barcode on a product, product packaging, product card, product advertisement, contractor service card, contractor service advertisement, combinations thereof, and/or the like. The scan may be electronically communicated to the at least one e-commerce computer system 410. The electronic service request 415 may comprise service data for at least one contractor service. The electronic service request 415 may comprise at least one service code.

Figure 5:
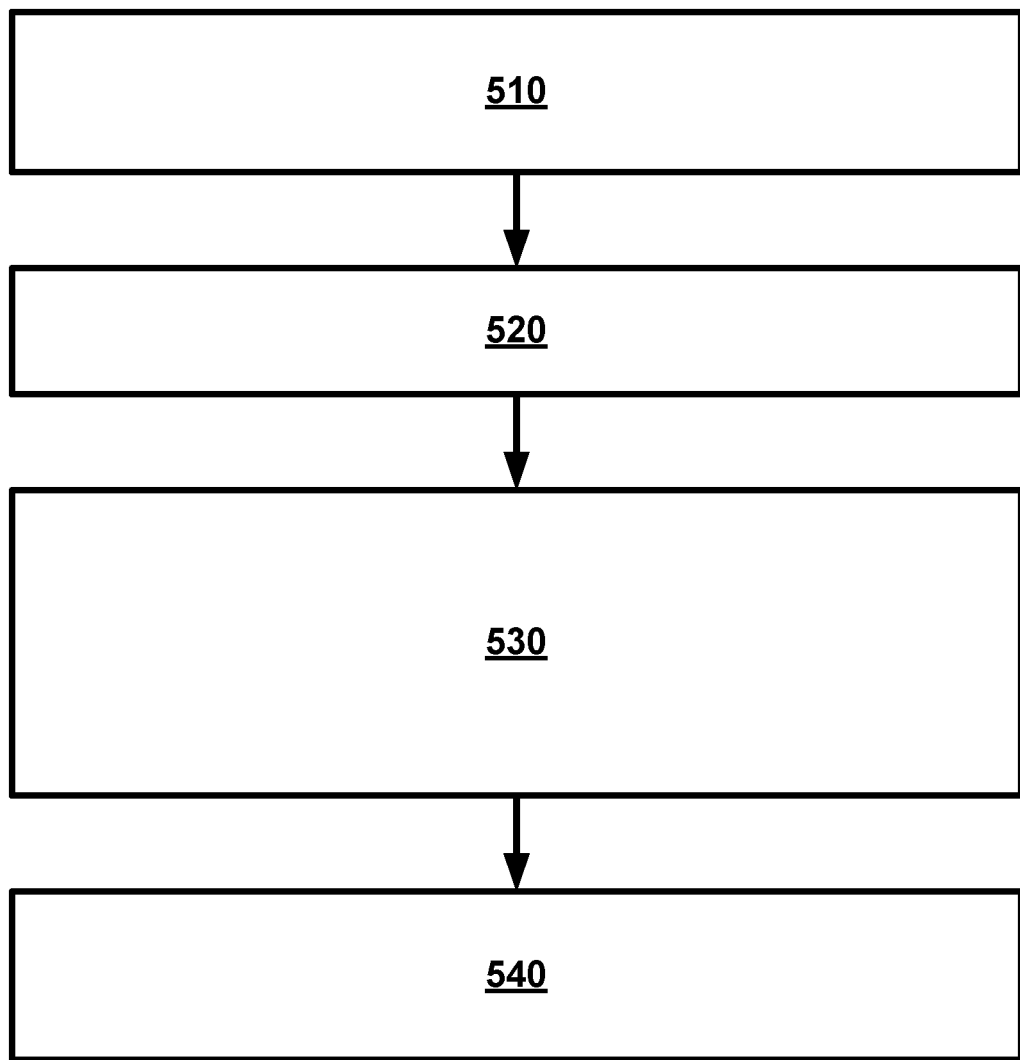
FIG. 5 is an example flow diagram of placing a product code and a service code in an electronic shopping cart as per an aspect of an embodiment.

FIG. 5 is an example flow diagram of placing a product code and a service code in an electronic shopping cart as per an aspect of an embodiment. An e-commerce computer system (for example 410) may be programmed to perform a method of selling at least one product with at least one contractor service. The at least one contractor service may be configured to be performed by a third-party contractor. The method performed by the e-commerce computer system (for example 410) may comprise electronically receiving at the e-commerce computer system (for example 410), from a purchaser computer system (for example 430), a selection of at least one product with at least one contractor service (for example 431) at 510. The method performed by the e-commerce computer system (for example 410) may comprise automatically placing a product code for the at least one product in an electronic shopping cart at 520. The method performed by the e-commerce computer system (for example 410) may comprise automatically placing a service code for the at least one contractor service in the electronic shopping cart at 530. The service code (for example 451) may be electronically received at the e-commerce computer system (for example 410) from a mapping computer system (for example 450). The service code (for example 451) may be automatically derived by the mapping computing system (for example 450) programmed to map the at least one product with the at least one contractor service. The service code (for example 451) may be based, at least in part, on the product code and/or product data related to the at least one product. The service code (for example 451) may be received from the mapping computer system (for example 450) prior to receiving the selection of at least one product with at least one contractor service (for example 431). For example, a plurality of service codes (for example 451) may be mapped to a plurality of product codes (for example 411) for a plurality of products with contractor services presented to the purchaser computer system (for example 430). According to some of the various embodiments, the service code (for example 451) may be received from the mapping computer system (for example 450) after receiving the selection of at least one product with at least one contractor service (for example 431). For example, the e-commerce computer system (for example 410) may be programmed to request a service code (for example 451) for a specific product code (for example 411) from the mapping computer system (for example 450). The e-commerce computer system (for example 410) may, for example, be programmed to download a service code (for example 451) for a specific product code (for example 411) from the mapping computer system (for example 450). According to some of the various embodiments, the method performed by the e-commerce computer system (for example 410) may comprise electronically completing a shopping cart transaction (for example 432) in electronic communication with the purchaser computer system (for example 430) at 540. According to some of the various embodiments, the method performed by the e-commerce computer system (for example 410) may comprise electronically presenting the electronic shopping cart to the purchaser computer system (for example 430) with a request (for example 416) to complete a purchase of the at least one product and the at least one contractor service at 540.

According to some of the various embodiments, a method performed by an e-commerce computer system (for example 410) may comprise electronically communicating first data to a purchaser computer system (for example 430). The first data may be configured to present a first webpage on a display in communication with the purchaser computer system (for example 430). The first webpage may comprise product data and contractor service data. The method performed by the e-commerce computer system (for example 410) may comprise electronically communicating second data to the purchaser computer system (for example 430). The method performed by the e-commerce computer system (for example 410) may comprise communicating the second data after receiving a selection of at least one product with at least one contractor service (for example 431). The second data may be configured to present a second webpage on a display in communication with the purchaser computer system (for example 430). The second webpage may comprise shopping cart data (for example 412). The shopping cart data (for example 412) may comprise at least one product code and at least one service code. The method performed by the e-commerce computer system (for example 410) may comprise electronically communicating third data to the purchaser computer system (for example 430). The third data may be configured to present terms of service (for example 413) on a display in communication with the purchaser computer system (for example 430). The terms of service (for example 413) may be presented through employment of an application, webpage, digital portal, Application Programming Interface (API), combinations thereof, and/or the like The terms of service (for example 413) may be presented with the second data.

According to some of the various embodiments, a method performed by an e-commerce computer system (for example 410) may comprise electronically communicating terms of service (for example 413) to a purchaser computer system (for example 430). The method performed by the e-commerce computer system (for example 410) may comprise electronically receiving an acceptance of the terms of service (for example 433) from the purchaser computer system (for example 430). The method performed by the e-commerce computer system (for example 410) may comprise electronically communicating the acceptance (for example 414) to a service processing computer system (for example 460). The service processing computer system (for example 460) may be implemented as a module of a mapping computer system (for example 450).

According to some of the various embodiments, a method performed by an e-commerce computer system (for example 410) may comprise automatically removing a service code from an electronic shopping cart based, at least in part, on at least one invalidation. The at least one invalidation may be based, at least in part, on a shipping address, billing address, and/or contact address. The shipping address and/or billing address may be communicated by a purchaser computer system (for example 430). The shipping address, billing address, and/or contact address may be stored in an account associated with a purchaser employing the purchaser computer system (for example 430). The account may be accessible by the e-commerce computer system (for example 410). The method performed by the e-commerce computer system (for example 410) may comprise electronically completing a shopping cart transaction (for example 432) through employment of at least one merchant exchange computer system. The method performed by the e-commerce computer system (for example 410) may comprise electronically completing a purchase of at least one product and at least one contractor service through employment of at least one merchant exchange computer system. The method performed by the e-commerce computer system (for example 410) may comprise electronically communicating an electronic service request (for example 415) to a service processing computer system (for example 460). The electronic service request (for example 415) may comprise a product code, a service code, purchaser contact data, combinations thereof, and/or the like.

According to some of the various embodiments, a tangible, non-transitory data storage medium may comprise an indicia of instructions for an e-commerce computer system 410 to perform an automated method of selling at least one product with at least one contractor service. The e-commerce computer system 410 may be coupled to a global computer network with access to at least one data storage device. The automated method performed according to the instructions may comprise electronically receiving at the e-commerce computer system 410, from a purchaser computer system 430, a selection of at least one product with at least one contractor service 431. The automated method performed according to the instructions may comprise automatically placing a product code for the at least one product in an electronic shopping cart. The automated method performed according to the instructions may comprise automatically placing a service code for the at least one contractor service in the electronic shopping cart. The service code 451 may be electronically received at the e-commerce computer system 410 from a mapping computer system 450. The service code 451 may be derived by the mapping computing system 450 configured to map the at least one product with the at least one contractor service. The automated method performed according to the instructions may comprise electronically presenting the electronic shopping cart 412 to the purchaser computer system 430. The automated method performed according to the instructions may comprise electronically completing the shopping cart transaction 432 in electronic communication with the purchaser computer system 430.

Figure 6:
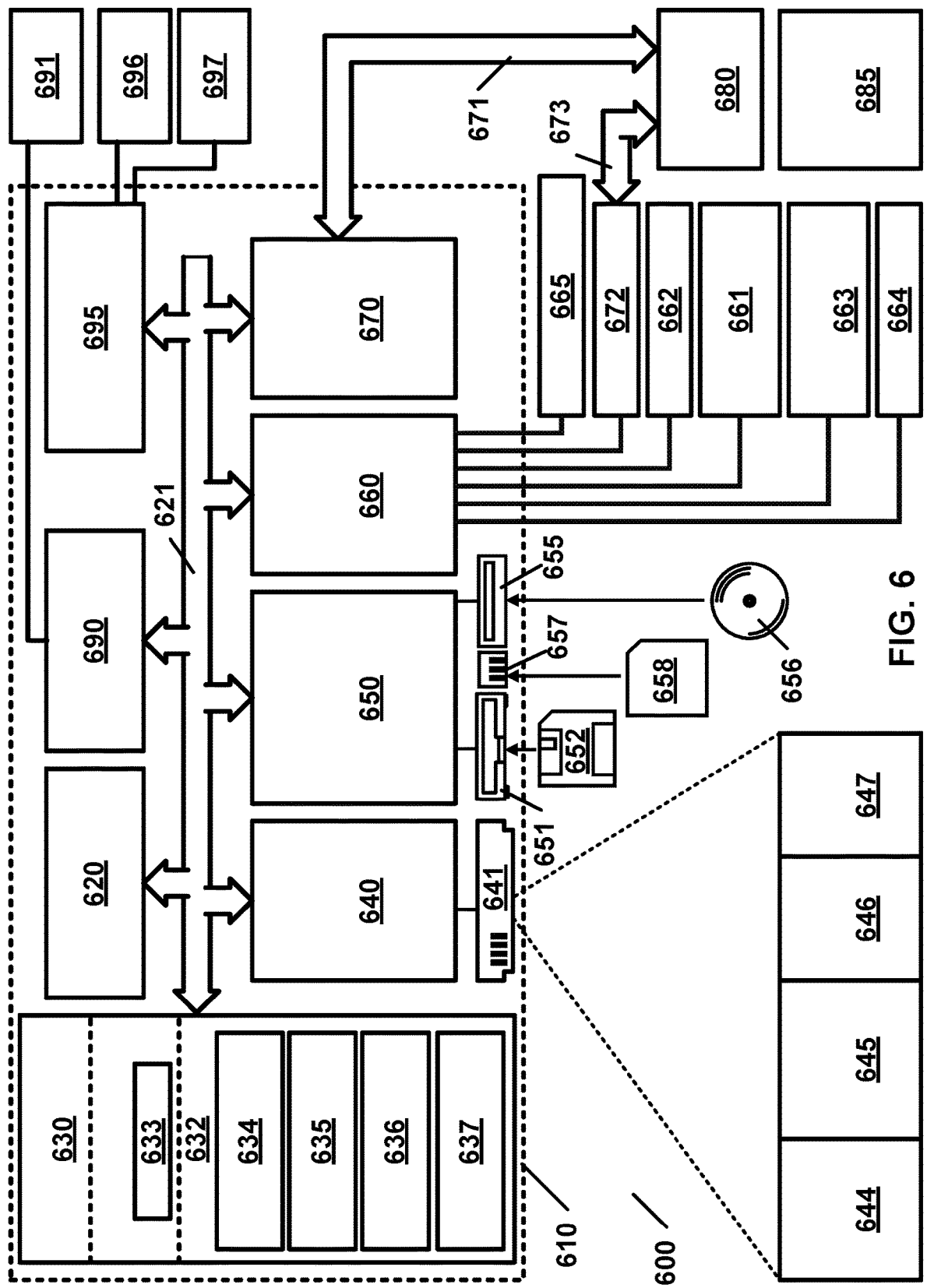
FIG. 6 is a block diagram of a computing environment in which aspects of embodiments of the present disclosure may be practiced.

FIG. 6 is a block diagram of a computing environment in which aspects of embodiments of the present disclosure may be practiced. The computing environment may comprise computing device 610. Components of computing device 610 may include, but are not limited to, a processing unit 620, a system memory 630, and a system bus 621 that couples various system components including the system memory 630 to the processing unit 620.

Computing device 610 may comprise a variety of computer readable media. Computer readable media may be available media accessible by computing device 610 and may include both volatile and nonvolatile media, removable and non-removable media. By way of example, and not limitation, computer readable media may comprise computer storage media and communication media. Computer storage media may comprise both volatile and nonvolatile, removable and non-removable media implemented in a method or technology for storage of data such as computer readable instructions, data structures, program modules, other data, combinations thereof, and/or the like. Computer storage media may comprise, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store data and which may be accessed by computer 610. Communication media may comprise computer readable instructions, data structures, program modules and/or other data in a modulated data signal such as a carrier wave and/or other transport mechanism and may comprise data delivery media. The term "modulated data signal" means a signal that has one or more of its characteristics set or changed in such a manner as to encode data in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

The system memory 630 may comprise computer storage media in the form of volatile and/or nonvolatile memory such as ROM 631 and RAM 632. A basic input/output system 633 (BIOS), containing the basic routines that help to transfer data between elements within computer 610, such as during start-up, may be stored in ROM 631. RAM 632 may comprise data and/or program modules that may be accessible to and/or presently being operated on by processing unit 620. By way of example, and not limitation, FIG. 6 illustrates operating system 634, application programs 635, other program modules 636, and program data 637.

The computing device 610 may also comprise other removable/non-removable volatile/nonvolatile computer storage media. By way of example only, FIG. 6 illustrates a hard disk drive 641 that may read from or write to non-removable, nonvolatile magnetic media, a magnetic disk drive 651 that may read from or write to a removable, nonvolatile magnetic disk 652, a flash drive reader 657 that may read flash drive 658, and an optical disk drive 655 that may read from or write to a removable, nonvolatile optical disk 656 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. The hard disk drive 641 may be connected to the system bus 621 through a non-removable memory interface such as interface 640, and magnetic disk drive 651 and optical disk drive 655 may be connected to the system bus 621 by a removable memory interface, such as interface 650.

The drives and their associated computer storage media discussed above and illustrated in FIG. 6 provide storage of computer readable instructions, data structures, program modules and other data for the computer 610. In FIG. 6, for example, hard disk drive 641 is illustrated as storing operating system 644, application programs 645, program data 647, and other program modules 646. Additionally, for example, non-volatile memory may include instructions for presenting images on a display 691 of computing device 600 and/or the like. Similarly, non-volatile memory may comprise instructions for causing the presentation of images on the display of a remote computing device 680 and/or the like. Display 691 and touch input 665 may be integrated into the same device.

A user may enter commands and data into computing device 610 through input devices such as a touch input device 665, a keyboard 662, a microphone 663, a camera 664, and a pointing device 661, such as a mouse, trackball or touch pad. These and other input devices may be connected to the processing unit 620 through interface 660 coupled to system bus 621, but may be connected by other interface and bus structures, such as a parallel port, game port or a universal serial bus (USB). A display 691 or other type of display device may be connected to the system bus 621 via an interface, such as a video interface 690. Other devices, such as, for example, speakers 697 and printer 696 may be connected to the system via output interface 695.

The computing device 610 may be operated in a networked environment using logical connections to one or more remote computers, such as a remote computer 680. Remote computer 680 may be a personal computer, a hand-held device, a server, a router, a network PC, a peer device or other common network node, and typically includes many or all of the elements described above relative to the computing device 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computing device 610 is connected to the LAN 671 through a network interface or adapter 670. When used in a WAN networking environment, the computing device 610 may comprise a modem 672 or other means for establishing communications over the WAN 673, such as the Internet. The modem 672, which may be internal or external, may be connected to the system bus 681 via interface 660, or other appropriate mechanism. The modem 672 may be wired or wireless. Examples of wireless devices may comprise, but are not limited to: Wi-Fi and Bluetooth. In a networked environment, program modules depicted relative to the computing device 610, or portions thereof, may be stored in the remote memory storage device. By way of example, and not limitation, FIG. 6 illustrates remote application programs 685 as residing on remote computer 680. It will be appreciated that the network connections shown are presented as examples only and other means of establishing a communications link between the computers may be used.

At least some embodiments of the present disclosure provide a certification computer system coupled to a global computer network with access to at least one data storage device and programmed to perform a method of automatically certifying at least two of a plurality of third-party contractors to provide at least one contractor service with at least one product.

The method performed by the certification computer system may comprise electronically receiving contractor data at the certification computer system from a plurality of contractor devices.

The method performed by the certification computer system may further comprise electronically storing at least a portion of the contractor data as certification data in at least one of the at least one data storage device.

The method performed by the certification computer system may further comprise automatically certifying at least two of the plurality of third-party contractors as at least two certified contractors based, at least in part, on the certification data.

The method performed by the certification computer system may further comprise electronically receiving an electronic service request communicated from an e-commerce computer system to the certification computer system, the electronic service request based, at least in part, on at least one purchase of at least one product with at least one contractor service made in electronic communication with a purchaser computer system.

The method performed by the certification computer system may further comprise automatically creating an electronic service work order based, at least in part, on the electronic service request.

The method performed by the certification computer system may further comprise automatically selecting a certified contractor from the at least two certified contractors.

The method performed by the certification computer system may further comprise electronically communicating the electronic service work order to the certified contractor.

At least some embodiments provide a certification computer system coupled to a global computer network with access to at least one data storage device and a means for performing a method of automatically certifying at least two of a plurality of third-party contractors to provide at least one contractor service with at least one product.

At least some of the plurality of third-party contractors may be licensed contractors.

The contractor data may comprise at least one contractor request for consideration for selection of at least one contractor service.

The electronic service request may comprise at least one of: purchaser data, product data, and service data.

The electronic service request may comprise service data on at least one of the following contractor services: at least one measurement, an installation, an assembly, a delivery, an inspection, a warranty certification, a repair under warranty, and a replacement under warranty.

The electronic service work order may comprise task data.

The method performed by the certification computer system may further comprise automatically certifying at least a portion of the plurality of third-party contractors based at least in part on: the certification data, and at least one contractor requirement.

The method performed by the certification computer system may further comprise electronically updating the certification data with at least one certification.

The method performed by the certification computer system may further comprise: electronically testing at least one of the plurality of third-party contractors through employment of at least one examination, the at least one examination accessible via the certification computer system, and automatically certifying at least one of the at least one of the plurality of third-party contractors as at least one certified contractor based, at least in part, on at least one result from the at least one examination.

The method performed by the certification computer system may further comprise automatically selecting the certified contractor based, at least in part, on the certification data.

The method performed by the certification computer system may further comprise electronically communicating a service order confirmation to a purchaser.

The method performed by the certification computer system may further comprise electronically receiving from the e-commerce computer system: shipping data and at least one shipping update, one of the at least one shipping update comprising delivery data of the at least one product.

The method performed by the certification computer system may further comprise electronically receiving service progress data from at least one of the plurality of contractor devices.

The method performed by the certification computer system may further comprise: automatically generating a contractor network report, and electronically communicating the contractor network report to a manager of the e-commerce computer system.

The method performed by the certification computer system may further comprise electronically communicating a consumer feedback survey to a purchaser.

The method performed by the certification computer system may further comprise electronically receiving consumer feedback survey data from the purchaser computer system.

At least some embodiments provide a tangible, non-transitory data storage medium comprising indicia of instructions for a certification computer system to perform an automated method of certifying at least one third-party contractor to provide at least one contractor service with at least one product, wherein the certification computer system is coupled to a global computer network with access to at least one data storage device.

The automated method performed according to the instructions may comprise electronically receiving contractor data at the certification computer system from a plurality of contractor devices.

The automated method performed according to the instructions may further comprise electronically storing the contractor data as certification data in at least one of the at least one data storage device.

The automated method performed according to the instructions may further comprise automatically certifying at least two of a plurality of third-party contractors as at least two certified contractors based, at least in part, on the certification data.

The automated method performed according to the instructions may further comprise electronically receiving an electronic service request communicated from an e-commerce computer system to the certification computer system, the electronic service request based, at least in part, on at least one purchase of at least one product with at least one contractor service made in electronic communication with a purchaser computer system.

The automated method performed according to the instructions may further comprise automatically creating an electronic service work order based, at least in part, on the electronic service request.

The automated method performed according to the instructions may further comprise automatically selecting a certified contractor from the at least two certified contractors.

The automated method performed according to the instructions may further comprise electronically communicating the electronic service work order to the certified contractor.

At least some embodiments provide a certification computer system coupled to a global computer network with access to at least one data storage device and programmed to perform a method of automatically certifying at least one third-party contractor to provide at least one contractor service with at least one product.

The method performed by the certification computer system may comprise electronically receiving contractor data at the certification computer system from a plurality of contractor devices.

The method performed by the certification computer system may further comprise electronically storing at least a portion of the contractor data as certification data in at least one of the at least one data storage device.

The method performed by the certification computer system may further comprise partially certifying, automatically, at least one of a plurality of third-party contractors as at least one partially-certified contractor based, at least in part, on the certification data.

The method performed by the certification computer system may further comprise electronically receiving an electronic service request communicated from an e-commerce computer system to the certification computer system, the electronic service request based, at least in part, on at least one purchase of at least one product with at least one contractor service made in electronic communication with a purchaser computer system.

The method performed by the certification computer system may further comprise automatically creating an electronic service work order based, at least in part, on the electronic service request.

The method performed by the certification computer system may further comprise electronically communicating at least one certification request to the at least one partially-certified contractor.

The method performed by the certification computer system may further comprise automatically certifying at least one of the at least one partially-certified contractor as at least one certified contractor based, at least in part, on a response to at least one of the at least one certification request.

The method performed by the certification computer system may further comprise automatically selecting a certified contractor from the at least one certified contractor.

The method performed by the certification computer system may further comprise electronically communicating the electronic service work order to the certified contractor.

At least some embodiments provide certification computer system coupled to a global computer network with access to at least one data storage device and a means for performing a method of automatically certifying at least one third-party contractor to provide at least one contractor service with at least one product.

The at least one certification request may comprise at least one examination accessible via the certification computer system.

The at least one certification request may be based, at least in part, on the certification data and the electronic service work order.

The method performed by the certification computer system may further comprise partially certifying, automatically, the at least one of the plurality of third-party contractors based at least in part on: the certification data and at least one contractor requirement.

The method performed by the certification computer system may further comprise automatically updating the certification data with at least one partial certification.

The method performed by the certification computer system may further comprise automatically updating the certification data with at least one certification.

The method performed by the certification computer system may further comprise automatically certifying the at least one of the at least one partially-certified contractor based, at least in part, on at least one response to the at least one certification request, the at least one response electronically communicated from at least one of the plurality of contractor devices to the certification computer system.

The method performed by the certification computer system may further comprise: electronically testing at least one of the plurality of third-party contractors through employment of at least one examination, the at least one examination accessible via the certification computer system, and partially certifying, automatically, at least one of the at least one of the plurality of third-party contractors based, at least in part, on at least one result from the at least one examination.

The method performed by the certification computer system may further comprise: electronically testing at least one of the at least one partially-certified contractor through employment of at least one examination, the at least one examination accessible via the certification computer system, and automatically certifying at least one of the at least one partially-certified contractor based, at least in part, on at least one result from the at least one examination.

The method performed by the certification computer system may further comprise automatically selecting the certified contractor based, at least in part, on the certification data.

At least some embodiments provide a tangible, non-transitory data storage medium comprising indicia of instructions for a certification computer system to perform an automated method of certifying at least one third-party contractor to provide at least one contractor service with at least one product, wherein the certification computer system is coupled to a global computer network with access to a data storage device.

At least some embodiments of the present disclosure provide an e-commerce computer system coupled to a global computer network and programmed to perform a method of selling at least one product with at least one contractor service.

The method performed by the e-commerce computer system may comprise electronically receiving at the e-commerce computer system, from a purchaser computer system, a selection of at least one product with at least one contractor service.

The method performed by the e-commerce computer system may further comprise automatically placing a product code for the at least one product in an electronic shopping cart.

The method performed by the e-commerce computer system may further comprise automatically placing a service code for the at least one contractor service in the electronic shopping cart, the service code electronically received at the e-commerce computer system from a mapping computer system, the service code automatically derived by the mapping computing system programmed to map the at least one product with the at least one contractor service.

The method performed by the e-commerce computer system may further comprise electronically completing a shopping cart transaction in electronic communication with the purchaser computer system.

At least some embodiments provide an e-commerce computer system coupled to a global computer network and a means for performing a method of selling at least one product with at least one contractor service.

The method performed by the e-commerce computer system may further comprise electronically presenting the electronic shopping cart to the purchaser computer system with a request to complete a purchase of the at least one product and the at least one contractor service.

The product code may represent at least one of the following: a product for sale, and a set of products for sale.

The at least one contractor service may comprise at least one of the following: at least one measurement, an installation, an assembly, a delivery, an inspection, a warranty certification, a repair under warranty, and a replacement under warranty.

The at least one service code may relate to at least one service price, the at least one service price based, at least in part, on location data, the location data electronically communicated from the purchaser computer system.

The method performed by the e-commerce computer system may further comprise electronically communicating first data to the purchaser computer system, the first data configured to present a first webpage on a display in communication with the purchaser computer system, the first webpage comprising product data and contractor service data.

The method performed by the e-commerce computer system may further comprise electronically communicating second data to the purchaser computer system, the second data configured to present a second webpage on a display in communication with the purchaser computer system, the second webpage comprising shopping cart data, the shopping cart data comprising the product code and the service code.

The method performed by the e-commerce computer system may further comprise electronically communicating third data to the purchaser computer system, the third data configured to present terms of service with a webpage on a display in communication with the purchaser computer system.

The method performed by the e-commerce computer system may further comprise electronically communicating terms of service to the purchaser computer system.

The method performed by the e-commerce computer system may further comprise: electronically communicating terms of service to the purchaser computer system, electronically receiving an acceptance of the terms of service from the purchaser computer system, and electronically communicating the acceptance to a service processing computer system.

The method performed by the e-commerce computer system may further comprise automatically removing the service code from the electronic shopping cart based on at least one invalidation.

The method performed by the e-commerce computer system may further comprise electronically completing the shopping cart transaction through employment of at least one merchant exchange computer system.

The method performed by the e-commerce computer system may further comprise electronically completing the purchase through employment of at least one merchant exchange computer system.

The method performed by the e-commerce computer system may further comprise electronically communicating an electronic service request to a service processing computer system, the electronic service request comprising the product code, the service code, and purchaser contact data.

At least some embodiments provide a tangible, non-transitory data storage medium comprising indicia of instructions for an e-commerce computer system to perform an automated method of selling at least one product with at least one contractor service, wherein the e-commerce computer system is coupled to a global computer network with access to at least one data storage device.

The automated method performed according to the instructions may comprise electronically receiving at the e-commerce computer system, from a purchaser computer system, a selection of at least one product with at least one contractor service.

The automated method performed according to the instructions may further comprise automatically placing a product code for the at least one product in an electronic shopping cart.

The automated method performed according to the instructions may further comprise automatically placing a service code for the at least one contractor service in the electronic shopping cart, the service code electronically received at the e-commerce computer system from a mapping computer system, the service code derived by the mapping computing system programmed to map the at least one product with the at least one contractor service.

The automated method performed according to the instructions may further comprise electronically completing the shopping cart transaction in electronic communication with the purchaser computer system.

The automated method performed according to the instructions may further comprise electronically presenting the electronic shopping cart to the purchaser computer system with a request to complete a purchase of the at least one product and the at least one contractor service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (in other words hardware with a biological element) or a combination thereof, all of which may be behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or the like. The processing hardware may be configured to execute instructions. The instructions may be stored on a machine-readable medium. According to some embodiments, the machine-readable medium (for example automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, computer systems have been described as including server(s), computer(s), mobile device(s), and/or wearable device(s). However, one skilled in the art will recognize that the relationships between server(s), computer(s), mobile device(s), and/or wearable device(s) may vary from a traditional server/device relationship over a global network such as the Internet. For example, a server may be collective based: portable equipment, broadcast equipment, virtual, application(s) distributed over a broad combination of computing sources, part of a cloud, and/or the like. Similarly, for example, a mobile device may be a user based client, portable equipment, broadcast equipment, virtual, application(s) distributed over a broad combination of computing sources, part of a cloud, integrated with at least one wearable device, and/or the like. Similarly, at least one wearable device may be configured to operate as a mobile device. Additionally, it should be noted that, for example purposes, several of the various embodiments may employ instructions operating in conjunction with hardware devices. However, one skilled in the art will recognize that many various languages and frameworks may be employed to build and use embodiments of the present disclosure. For example, languages/frameworks may be based upon Java, HTML, XML, PHP, Python, ActionScript, JavaScript, Ruby, Prolog, SQL, VBScript, Visual Basic, Perl, C, C++, Objective-C combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, the purpose of the Abstract of the Disclosure is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A certification computer system coupled to a global computer network with access to at least one data storage device and programmed to perform a method of automatically certifying at least two of a plurality of third-party contractors to provide at least one contractor service with at least one product, the method performed by the certification computer system comprising:

a) electronically receiving contractor data at the certification computer system from a plurality of contractor devices;
   b) electronically storing at least a portion of the contractor data as certification data in at least one of the at least one data storage device;
   c) automatically certifying at least two of the plurality of third-party contractors as at least two certified contractors based, at least in part, on the certification data;
   d) electronically receiving an electronic service request communicated from an e-commerce computer system to the certification computer system, the electronic service request based, at least in part, on at least one purchase of at least one product with at least one contractor service made in electronic communication with a purchaser computer system;
e) automatically creating an electronic service work order based, at least in part, on the electronic service request;
f) automatically selecting a certified contractor from the at least two certified contractors; and
g) electronically communicating the electronic service work order to the certified contractor.

2. The system according to claim 1, wherein at least some of the plurality of third-party contractors are licensed contractors.

3. The system according to claim 1, wherein the contractor data comprises at least one contractor request for consideration for selection of at least one contractor service.

4. The system according to claim 1, wherein the electronic service request comprises:
a) purchaser data;
b) product data; and
c) service data.

5. The system according to claim 1, wherein the electronic service request comprises service data on at least one of the following contractor services:
a) at least one measurement;
b) an installation;
c) an assembly;
d) a delivery;
e) an inspection;
f) a warranty certification;
g) a repair under warranty; and
h) a replacement under warranty.

6. The system according to claim 1, wherein the electronic service work order comprises task data.

7. The system according to claim 1, the method performed by the certification computer system further comprising automatically certifying at least a portion of the plurality of third-party contractors based at least in part on:
a) the certification data; and
b) at least one contractor requirement.

8. The system according claim 1, the method performed by the certification computer system further comprising electronically updating the certification data with at least one certification.

9. The system according to claim 1, the method performed by the certification computer system further comprising:
a) electronically testing at least one of the plurality of third-party contractors through employment of at least one examination, the at least one examination accessible via the certification computer system; and
b) automatically certifying at least one of the at least one of the plurality of third-party contractors as at least one certified contractor based, at least in part, on at least one result from the at least one examination.

10. The system according to claim 1, the method performed by the certification computer system further comprising automatically selecting the certified contractor based, at least in part, on the certification data.

11. The system according to claim 1, the method performed by the certification computer system further comprising electronically communicating a service order confirmation to a purchaser.

12. The system according claim 1, the method performed by the certification computer system further comprising electronically receiving from the e-commerce computer system: shipping data and at least one shipping update, one of the at least one shipping update comprising delivery data of the at least one product.

13. The system according to claim 1, the method performed by the certification computer system further comprising electronically receiving service progress data from at least one of the plurality of contractor devices.

14. The system according to claim 1, the method performed by the certification computer system further comprising:
a) automatically generating a contractor network report; and
b) electronically communicating the contractor network report to a manager of the e-commerce computer system.

15. The system according to claim 1, the method performed by the certification computer system further comprising electronically communicating a consumer feedback survey to a purchaser.

16. The system according to claim 1, the method performed by the certification computer system further comprising electronically receiving consumer feedback survey data from the purchaser computer system.

17. A tangible, non-transitory data storage medium comprising indicia of instructions for a certification computer system to perform an automated method of certifying at least one third-party contractor to provide at least one contractor service with at least one product, wherein the certification computer system is coupled to a global computer network with access to at least one data storage device, the automated method performed according to the instructions comprising:
a) electronically receiving contractor data at the certification computer system from a plurality of contractor devices;
b) electronically storing the contractor data as certification data in at least one of the at least one data storage device;
c) automatically certifying at least two of a plurality of third-party contractors as at least two certified contractors based, at least in part, on the certification data;
d) electronically receiving an electronic service request communicated from an e-commerce computer system to the certification computer system, the electronic service request based, at least in part, on at least one purchase of at least one product with at least one contractor service made in electronic communication with a purchaser computer system;
e) automatically creating an electronic service work order based, at least in part, on the electronic service request;
f) automatically selecting a certified contractor from the at least two certified contractors; and
g) electronically communicating the electronic service work order to the certified contractor.

18. A certification computer system coupled to a global computer network with access to at least one data storage device and programmed to perform a method of automatically certifying at least one third-party contractor to provide at least one contractor service with at least one product, the method performed by the certification computer system comprising:
a) electronically receiving contractor data at the certification computer system from a plurality of contractor devices;
b) electronically storing at least a portion of the contractor data as certification data in at least one of the at least one data storage device;
c) partially certifying, automatically, at least one of a plurality of third-party contractors as at least one partially-certified contractor based, at least in part, on the certification data;

d) electronically receiving an electronic service request communicated from an e-commerce computer system to the certification computer system, the electronic service request based, at least in part, on at least one purchase of at least one product with at least one contractor service made in electronic communication with a purchaser computer system;
e) automatically creating an electronic service work order based, at least in part, on the electronic service request;
f) electronically communicating at least one certification request to the at least one partially-certified contractor;
g) automatically certifying at least one of the at least one partially-certified contractor as at least one certified contractor based, at least in part, on a response to at least one of the at least one certification request;
h) automatically selecting a certified contractor from the at least one certified contractor; and
i) electronically communicating the electronic service work order to the certified contractor.

19. The system according to claim 18, wherein the at least one certification request comprises at least one examination accessible via the certification computer system.

20. The system according to claim 18, wherein the at least one certification request is based, at least in part, on the certification data and the electronic service work order.

21. The system according to claim 18, the method performed by the certification computer system further comprising partially certifying, automatically, the at least one of the plurality of third-party contractors based at least in part on:
   a) the certification data; and
   b) at least one contractor requirement.

22. The system according to claim 18, the method performed by the certification computer system further comprising automatically updating the certification data with at least one partial certification.

23. The system according to claim 18, the method performed by the certification computer system further comprising automatically updating the certification data with at least one certification.

24. The system according to claim 18, the method performed by the certification computer system further comprising automatically certifying the at least one of the at least one partially-certified contractor based, at least in part, on at least one response to the at least one certification request, the at least one response electronically communicated from at least one of the plurality of contractor devices to the certification computer system.

25. The system according to claim 18, the method performed by the certification computer system further comprising:
   a) electronically testing at least one of the plurality of third-party contractors through employment of at least one examination, the at least one examination accessible via the certification computer system; and
   b) partially certifying, automatically, at least one of the at least one of the plurality of third-party contractors based, at least in part, on at least one result from the at least one examination.

26. The system according to claim 18, the method performed by the certification computer system further comprising:
   a) electronically testing at least one of the at least one partially-certified contractor through employment of at least one examination, the at least one examination accessible via the certification computer system; and
   b) automatically certifying at least one of the at least one partially-certified contractor based, at least in part, on at least one result from the at least one examination.

27. The system according to claim 18, the method performed by the certification computer system further comprising automatically selecting the certified contractor based, at least in part, on the certification data.

28. A tangible, non-transitory data storage medium comprising indicia of instructions for a certification computer system to perform an automated method of certifying at least one third-party contractor to provide at least one contractor service with at least one product, wherein the certification computer system is coupled to a global computer network with access to a data storage device, the method performed according to the instructions comprising:
   a) electronically receiving contractor data at the certification computer system from a plurality of contractor devices;
   b) electronically storing the contractor data as certification data in the data storage device;
   c) partially certifying, automatically, at least one of a plurality of third-party contractors as at least one partially-certified contractor based, at least in part, on the certification data; electronically receiving an electronic service request communicated from an e-commerce computer system to the certification computer system, the electronic service request based, at least in part, on at least one purchase of at least one product with at least one contractor service made in electronic communication with a purchaser computer system;
   d) automatically creating an electronic service work order based, at least in part, on the electronic service request;
   e) electronically communicating at least one certification request to the at least one partially-certified contractor;
   f) automatically certifying at least one of the at least one partially-certified contractor as at least one certified contractor based, at least in part, on a certification response to at least one of the at least one certification request;
   g) automatically selecting a certified contractor from the at least one certified contractor; and
   h) electronically communicating the electronic service work order to the certified contractor.

* * * * *